United States Patent
Bernat

(10) Patent No.: US 12,182,021 B2
(45) Date of Patent: Dec. 31, 2024

(54) METHODS AND APPARATUS TO ENABLE SECURE MULTI-COHERENT AND POOLED MEMORY IN AN EDGE NETWORK

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 17/133,486

(22) Filed: Dec. 23, 2020

(65) Prior Publication Data

US 2021/0149803 A1 May 20, 2021

(51) Int. Cl.
*G06F 12/0815* (2016.01)
*G06F 3/06* (2006.01)

(52) U.S. Cl.
CPC ........ *G06F 12/0815* (2013.01); *G06F 3/0604* (2013.01); *G06F 3/0631* (2013.01); *G06F 3/0679* (2013.01); *G06F 2212/621* (2013.01)

(58) Field of Classification Search
CPC .. G06F 12/0815; G06F 3/0604; G06F 3/0631; G06F 3/0679; G06F 3/0614; G06F 3/062; G06F 3/067; G06F 3/0625; G06F 3/0655; G06F 2212/621
See application file for complete search history.

(56) References Cited

U.S. PATENT DOCUMENTS

| | | | |
|---|---|---|---|
| 2015/0186069 A1* | 7/2015 | Sharma | G06F 9/5016 711/153 |
| 2018/0225254 A1* | 8/2018 | Hu | H04L 12/4641 |
| 2019/0018813 A1* | 1/2019 | Das Sharma | G06F 13/404 |
| 2020/0259637 A1* | 8/2020 | Spohn | H04L 9/0643 |
| 2022/0066928 A1* | 3/2022 | Tavallaei | G06F 12/123 |
| 2022/0164288 A1* | 5/2022 | Ramagiri | G06F 12/0815 |
| 2023/0376412 A1* | 11/2023 | Erickson | G06F 12/0292 |

OTHER PUBLICATIONS

Langvad, R., "What is a Comonent Library," Nov. 2020, https://langvad.dev/blog/what-is-a-component-library/.*
Das Sharma, D., "Introduction to Compute Express LinkTM," Mar. 2019, available: https://www.computeexpresslink.org/resource-library.*
Das Sharma, D. and S. Tavallaei, "Compute Express LinkTM 2.0 White Paper," Nov. 2020, available: https://www.computeexpresslink.org/resource-library.*

* cited by examiner

*Primary Examiner* — Tracy A Warren
(74) *Attorney, Agent, or Firm* — Hanley, Flight & Zimmerman

(57) ABSTRACT

Methods, apparatus, systems and articles of manufacture are disclosed to enable secure memory sharing in a multi-tenant edge network. Examples disclosed herein include mapping a first node to a memory region in response to receiving a memory access request from a second node mapped to the memory region, providing a private security key associated with the memory region to the first node, and applying a cache coherency protocol to the first node and the second node in response to the pooled memory controller mapping the first node to the memory region.

26 Claims, 13 Drawing Sheets

METHODS AND APPARATUS TO ENABLE SECURE MULTI-COHERENT AND POOLED MEMORY IN AN EDGE NETWORK

BACKGROUND

Edge computing is a decentralized computing environment in which events, requests, and data streams are processed in a manner leading to low and deterministic latency responses. Edge computing, communication, and storage resources are aggregated flexibly and dynamically in hierarchical or peer-to-peer relationships. Thus, edge computing networks have the ability to mobilize operations with critical response-time and/or bandwidth needs to local networks, e.g., networks at the "far edge," while mobilizing operations with complex, computation intensive operations to deeper and richer resource networks in traditional clouds, e.g., networks at the "near edge."

Figure 1:
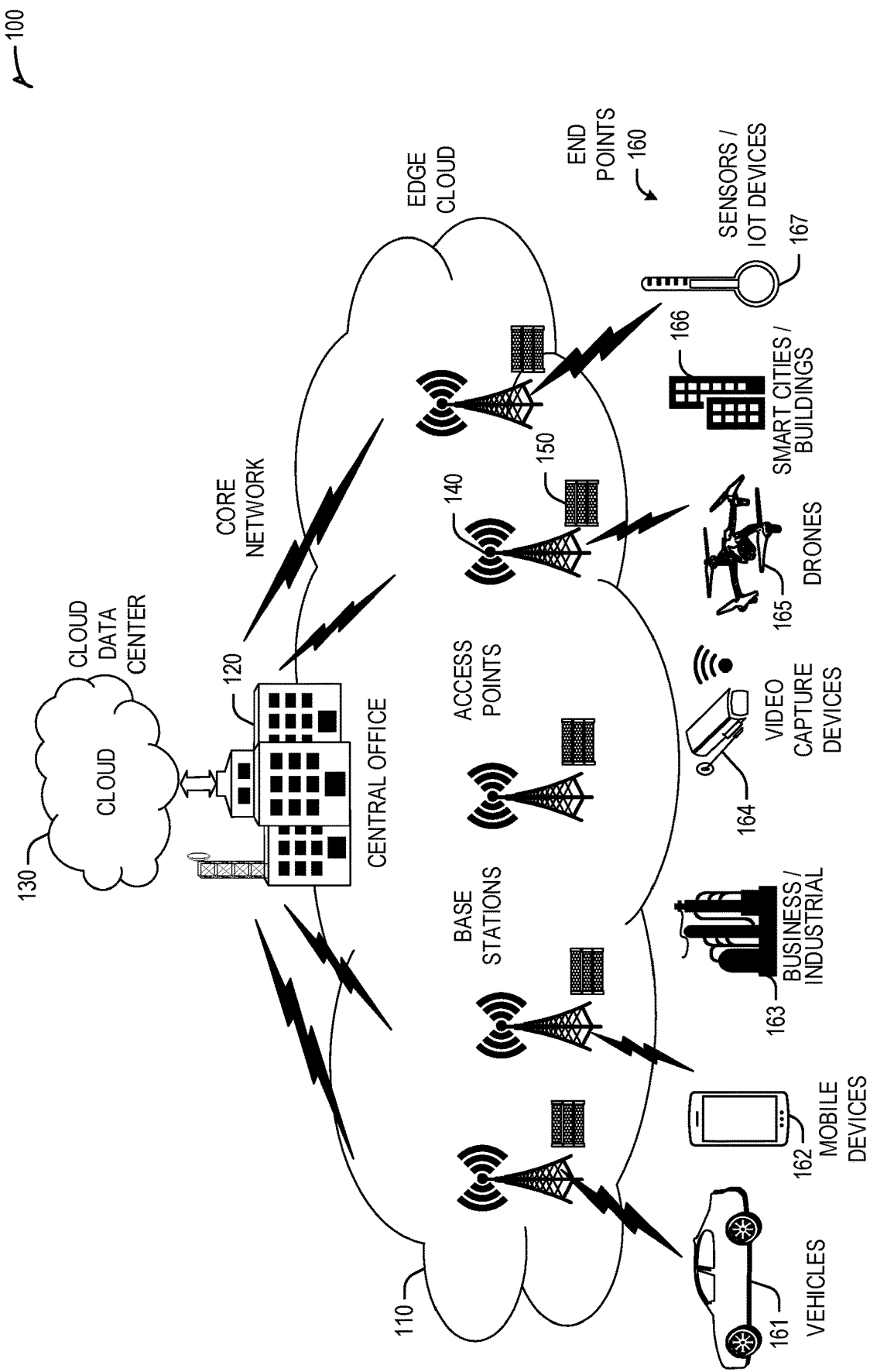
FIG. 1 illustrates an overview of an edge cloud configuration for edge computing.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
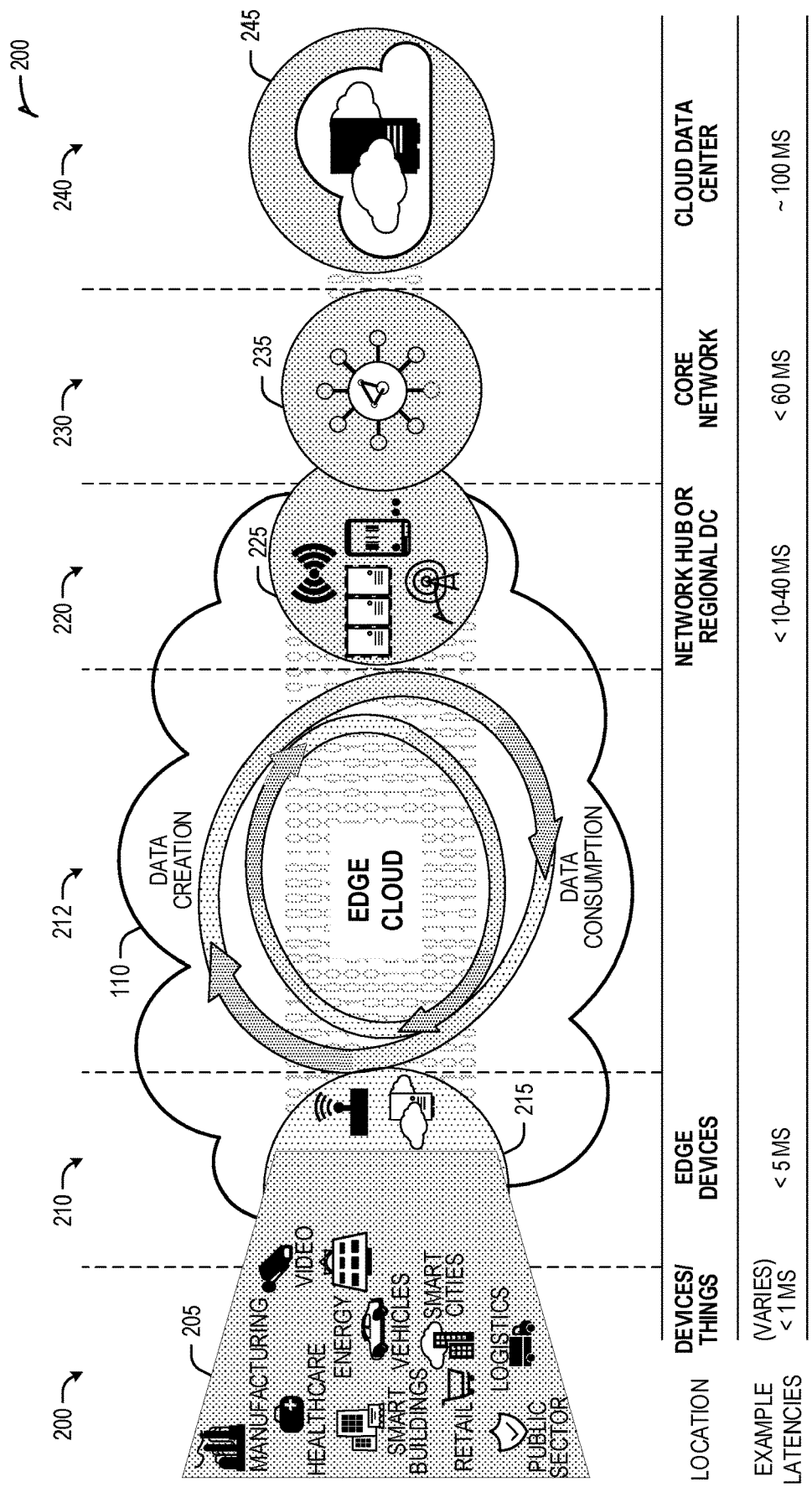
FIG. 2 is a diagram illustrating operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 (FIG. 1) among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QOS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
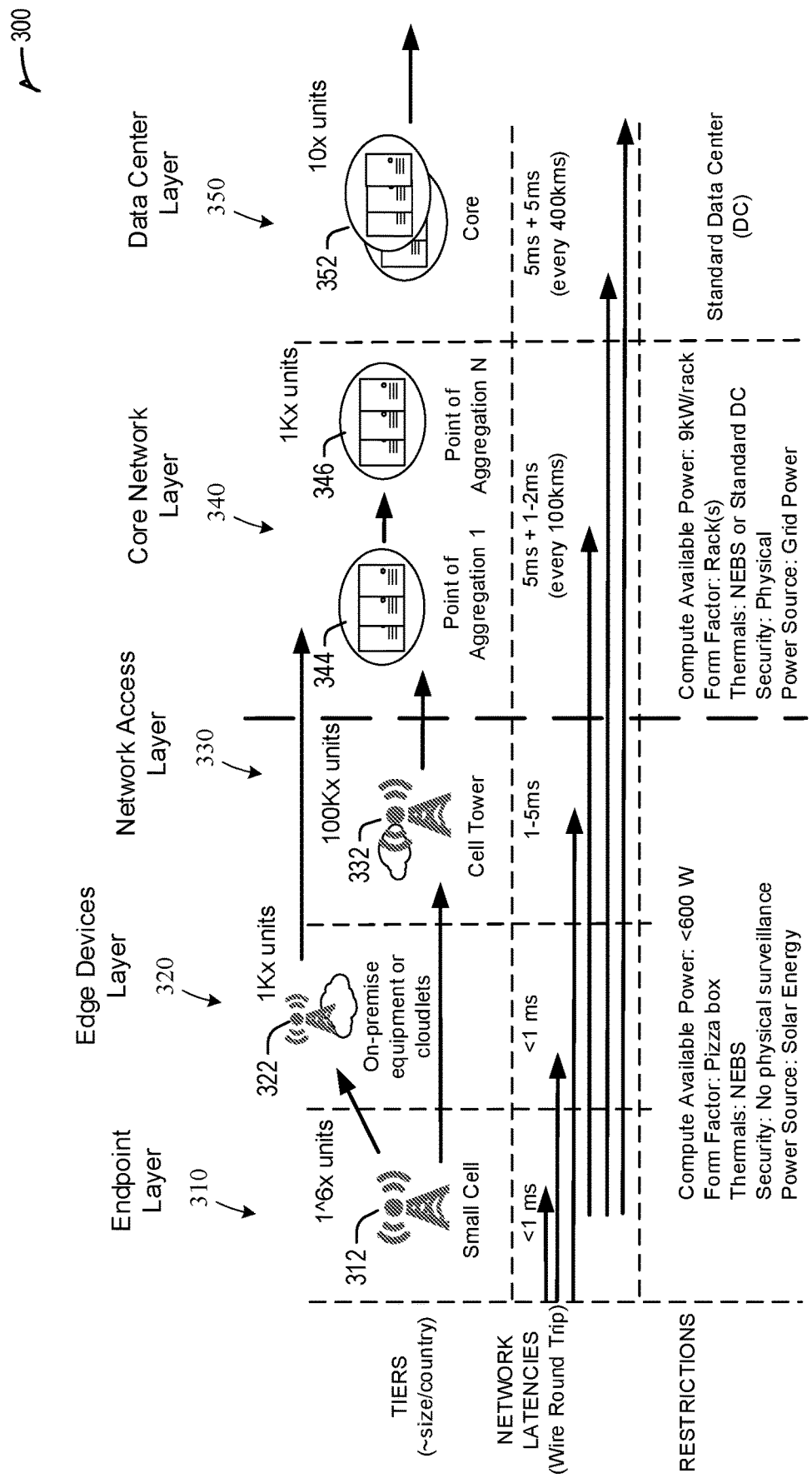
FIG. 3 is another diagram illustrating operational layers among endpoints, an edge cloud, and cloud computing environments shown with example latency ranges, power sources, and other operational parameters corresponding to network layers in an edge network.

FIG. 3 is another diagram illustrating operational layers among endpoints, an edge cloud, and cloud computing environments shown with example latency ranges, power sources, and other operational parameters corresponding to network layers in an edge network. The layers begin at an example endpoint (devices and things) layer 310 and span multiple network layers, such as an example edge devices layer 320 having gateways, on-premise servers, or network equipment (example nodes 322) located in physically proximate edge systems; an example network access layer 330, encompassing base stations, radio processing units, network hubs, regional data centers (DC), or local network equipment (example equipment 332); an example data center layer 350 having an example core data center 352; and any equipment, devices, or nodes located therebetween (e.g., in example core network layer 340).

The layers of the example edge network illustrated in FIG. 3 span a range of latencies from less than one millisecond at the endpoint layer 310 to over five milliseconds at the data center layer 350. Generally, the closer an edge node is to a user endpoint, the lower the latency for communications between the edge node and the user endpoint. On the other hand, as an edge device is moved closer to a user endpoint, the more likely it is to be subject to constraints on power consumption, storage capacity, and memory life. For example, edge devices 312 located at the endpoint layer 310, edge equipment 322 located at the edge device layer 320, and base station servers 332 located at the network access layer 330 may be battery-operated and/or solar powered and, thus, may be limited in available compute power and thermal stability. For example, the example edge devices 312, the example edge equipment 322, and the example base stations 332 illustrated in FIG. 3 may be constrained to less than 600 watts of compute power available. In addition, the example edge devices 312 located at the endpoints layer 310, the example edge equipment located at the edge devices layer 320, and the example base stations located at the example network access layer 330 may not have physical security or surveillance to protect the equipment or the data stored on the equipment.

Typically, resource constraints exhibited at the edge are addressed through the pooling of memory and storage resources for use by multiple users (tenants) and devices. Many memory technologies used at the edge are emerging technologies in which more power requires greater memory bandwidth. Thus, pooled memory resources deployed at the edge often experience power-performance tradeoffs making power usage optimization a priority for improving memory technologies in edge networks. Likewise, improved security of hardware and root of trust trusted functions are also priorities because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

Persistent memory (PMEM) is a type of emerging memory technology that has many applications in edge networking. PMEM, with its large storage capacities at lower costs than DRAM while maintaining DRAM-like speeds with persistence, offers a tradeoff between dynamic random access memory (DRAM) and not-and (NAND) flash memory. Dual in-line memory modules (DIMMs), with their disk-like storage capacity and DRAM-like speeds, are a promising form of persistent memory that may improve the disk tier and the memory tier, and thus may be applicable to edge architectures and in-memory architectures.

DIMMs, despite their high speed and large storage capacities, may be subject to similar constraints as other edge resources, e.g., power consumption, memory life, physical security, reliability, and data sharing. For example, larger capacity DIMMs (e.g., 512 GB DIMMs) may be power constrained at about 15 W. Installment, replacement, and management of hundreds of thousands/millions of far edge deployments and the corresponding non-volatile (NVM) memory may be associated with large operating costs. In addition, most far edge deployments do not include any sort of physical security (e.g., security guard, on-site person) so customers may be reluctant to run services, e.g., service involving sensitive data, on the edge using persistent memory, even despite security protocols and memory encryption technologies such as multi-key total memory encryption (MKTME). Further, edge devices at far edge locations may be subject to extreme thermals and ambient conditions, thus subjecting the memory equipment and technology to higher failure rates. Further still, in many distributed edge architectures, multiple elements may be sharing and processing data (e.g., internet of things (IoT), garden wall (GW), base stations, drones, etc.) and native low latency mechanisms for data sharing may be desired at scale.

Far edge technologies are expected to experience enormous growth in computational ability in the coming years. In light of current ecosystem trends, the far edge will be increasingly consolidated with more distributed computing power to provide ultra-low latency services such as vehicle-to-vehicle (V2V) communication and vehicle-to-everything (V2X) communication. While some current edge platforms employ different types of memory within the same edge architecture, e.g., local platform memory (DDR or PMEM) and local pooled memory, current platform solutions for edge deployments do not address the aforementioned challenges related to power consumption, memory life, physical security, reliability, and data sharing. As current edge architectures are trending to have increasingly low latencies (<1 ms) between the far edge and near edge (where over 5G memory would be placed), an improved type of memory, exposed as a different address space, may offer improved memory capabilities to supplement local memory (e.g., higher latency and less bandwidth but with higher reliability, less power and higher security).

Examples disclosed herein offer improved memory capabilities by enabling multiple data consumers and providers in an edge network to create and manage shared memory regions securely and dynamically by exposing regular memory operations. Examples disclosed herein include a remote pooled memory to improve the deployment of non-volatile memories (e.g., DIMMs) at the far edge by improving power consumption, memory life, security, reliability, and data sharing capabilities. Some examples disclosed herein include a remote pooled memory hosted at the data center layer of the edge network, e.g., at core data centers, and tunneled via wired connectivity, e.g., 5G for Green Edge or wired connectivity for power grid edge. Some examples disclosed herein enable the secure sharing and management of pooled memory resources by implementing secure data access protocols and coherency protocols over wired communication networks.

Figure 4:
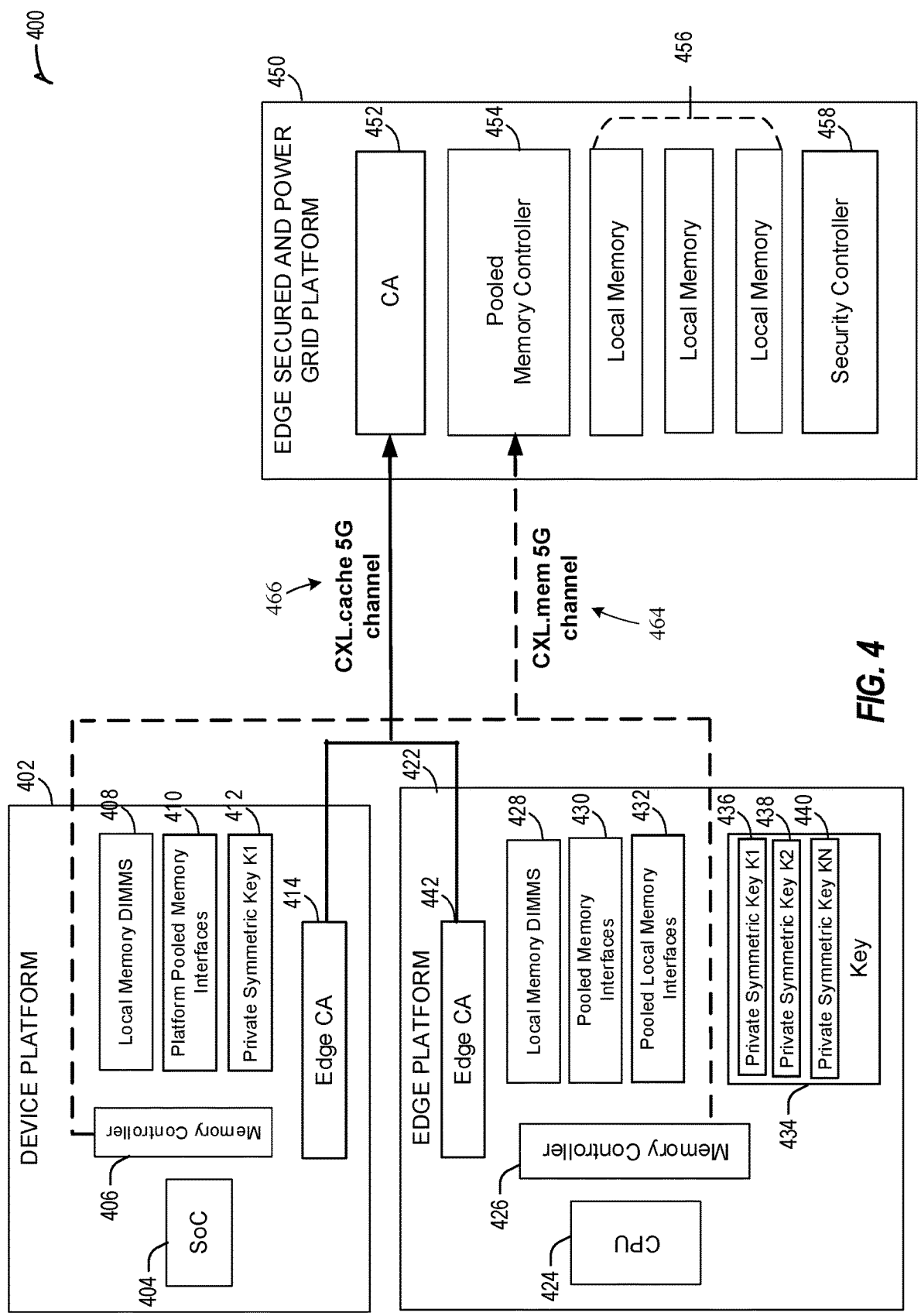
FIG. 4 is a block diagram of an example edge computing system to enable secure pooled memory sharing in an edge computing network in accordance with teachings of this disclosure.

FIG. 4 is a block diagram of an example edge computing system 400 to enable secure pooled memory sharing in an edge computing network (e.g., example edge network 100 of FIG. 1). In some examples, the example edge computing system 400 is part of a multi-tenant edge network that provides compute, memory, and storage resources to multiple edge devices (e.g., consumer endpoints 160 of FIG. 1) running applications through service providers such as Facebook and/or Google. In some examples, the network provider and the service provider agree to Quality of Service (QoS) standards and/or implement service level agreements (SLAs) setting forth operating parameters that the network provider agrees to comply with when providing services to consumers through the edge computing network (e.g., a range of operating latencies, operating bandwidth, or other suitable operating parameters). In some examples, multiple service providers utilize the same edge computing network 100 (FIG. 1) to form a shared computing environment (e.g., multi-tenant network) where multiple service providers utilize the same computing, memory, and storage resources to provide applications and/or services to consumers. For example, a garden wall (GW) service provider (e.g., Facebook or Google) may utilize an example edge network 100 to provide streaming services to consumer end points 160 (FIG. 1) at the far edge while a security and surveillance provider may utilize the same edge computing network to run security and surveillance applications for drones, cameras, and security systems. In some examples, different service providers may require different QOS standards and/or implement different SLAs.

The example edge computing system 400 of FIG. 4 includes an example device platform 402 (e.g., an example first node) implemented on an example edge device (e.g., the example consumer end point devices 160 illustrated in FIG. 1). In some examples, the example device platform 402 is located at the far edge of the edge network near the consumer end point(s) (e.g., the network layer 200 illustrated in FIG. 2). In some examples, the example device platform 402 is a front-end for PMEM (e.g., pooled DIMMs) hosted in the next level of the edge (e.g., the example remote secured and power grid platform 450). In some examples, the example device platform 402 is implemented on an example system on chip (SoC) 404 (e.g., the Intel® Atom™ SoC developed by Intel®). In some examples, the example SoC 404 performs processing tasks for applications and/or services running on the example device platform 402. In some examples, a first application (e.g., a streaming application, a weather application, or a surveillance application) runs on the example device platform 402. In some examples, the example SoC 404 communicates with an example device memory controller 406 to request access to memory regions on an example device local memory 408 on the example device platform 402 (e.g., to read/write to memory regions on the example device local memory 408). In some examples, the example device local memory 408 stores data, algorithms, and/or other information on the example device platform 402. In some examples, the example device local memory 408 includes a dual-in-memory-module(s) (DIMMs) to store information on the example device platform 402. In some examples, the example local memory 408 implements double data rate (DDR), dynamic random access memory (DRAM), and/or other non-volatile memory to store information on the example device platform 402. In some examples, example platform pooled memory interfaces 410 (e.g., pooled 5G DIMMs interfaces) communicate with the example device memory controller 406 to access a memory region in the example secure pooled memory 456 of the example remote secured and power grid platform 450. In some examples, the example device memory controller 406 sends and/or manages memory access requests. In some examples, the memory access requests are for shared access, exclusive access, and/or ownership of a memory region.

In some examples, the example device memory controller 406 of the example device platform 402 manages local memory resources of the example device local memory 408, communicates with (e.g., sends memory requests to) the example remote secured and power grid platform 450 via an example first communication channel 464, and facilitates transfer of requests, information, and/or payloads between the example device platform 402, the example edge platform 422, and the example remote secured and power grid platform 450. In some examples, the example first communication channel 464 is a wireless communication channel, e.g., a 5G wireless communication channel. In some examples, the example first communication channel 464 is implemented using a secure component library for cross-platform (e.g., Compute Express Link (CXL)) memory framework and/or protocol (e.g., CXL.mem). In some examples, the CXL.mem framework/protocol is mapped to the example device memory controller 406 of the example device platform 402. In some examples, the example memory controller 406 tunnels memory requests to the example remote secured and power grid platform 450 via a CXL switch.

In some examples, the example device memory controller 406 sends requests to the example remote secured and power grid platform 450 to access a memory region (e.g., a memory range or a memory line), to map a second node (e.g., the example edge platform 422) to a memory region in which the example device platform 402 is mapped, or to request exclusive access to a memory region in the secure pooled memory 456. In some examples, the example device platform includes expanded operating system (OS) mechanisms (e.g., malloc and/or malloca) to allocate memory to memory regions (e.g., the example secure pooled memory 456 of the example remote secured and power grid platform 450). In some examples, the example device platform 402 receives access grants and/or denials to the memory region, sends/receives encrypted payloads to/from the example remote secured and power grid platform 450, and/or receives private security keys (e.g., the example private symmetric key 412) from the example remote secured and power grid platform 450 to encrypt and/or decrypt the payloads sent/received to/from the remote secured and power grid platform 450.

The example device platform 402 of the example edge computing system 400 illustrated in FIG. 4 includes an example device caching agent (CA) 414 to communicate with the example remote secured and power grid platform 450. In some examples, the example device CA 414 communicates with an example remote CA 452 of the example remote secured and power grid platform 450 via an example second communication channel 466 to implement coherency protocols (e.g., (a) a modified, shared, invalid (MSI) protocol, (b) a modified, exclusive, shared, invalid (MESI) protocol, (c) a modified, owned, shared, invalid (MOSI) protocol, (d) a modified, owned, exclusive, shared, invalid (MOESI) protocol, (e) a modified, exclusive, shared, invalid, forward (MESIF) protocol, (f) a modified, owned, exclusive, shared, invalid, forward (MOESIF) protocol, or any other suitable coherency protocol) for memory access between the example device platform 402 (e.g., the example SoC 404 of the example device platform 402) and the example secure pooled memory 456 of the example remote secured and power grid platform 450 during memory sharing operations (e.g., when multiple edge nodes are sharing a memory region in the example secure pooled memory 456). In some examples, the example second communication channel 466 is a wireless communication channel, e.g., a 5G wireless communication channel. In some examples, the example second communication channel 466 is implemented using a secure component library for cross-platform (e.g., Compute Express Link (CXL)) cache framework and/or protocol (e.g., CXL.cache).

The example edge computing system 400 illustrated in FIG. 4 includes an example edge platform 422 (e.g., an example second node) that may be implemented on an edge computing node (e.g., the example base station 140 illustrated in FIG. 1). In some examples, the example edge platform 422 is located at the fog edge of the edge network (e.g., the layer 210 illustrated in FIG. 2). In some examples, the example edge platform 422 includes an example central processing unit (CPU) 424 to perform processing tasks for applications and/or services running on the example edge platform 422. In some examples, the example edge platform 422 includes example platform local memory 428 to store data, algorithms, or other information on the example edge platform 422. In some examples, the example CPU 424 communicates with an example memory controller 426 to request access to a memory region (e.g., a memory range or memory line) in the example platform local memory 428 or the example secure pooled memory 456 (e.g., to read/write information to the memory region). In some examples, the example edge platform includes expanded operating system (OS) mechanism (e.g., malloc and/or malloca) to allocate memory to memory regions (e.g., the example secure pooled memory 456). In some examples, the example platform local memory 428 stores data, algorithms, and/or other information on the example edge platform 422. In some examples, example edge pooled memory interfaces 430 (e.g., a pooled 5G memory interface) of the example edge platform 422 communicate with the example platform memory controller 426 to access a memory region (e.g., memory range or memory line) of the example secure pooled memory 456 of the example remote secured and power grid platform 450 in response to a determination that the example platform local memory 428 does not include the memory region.

In some examples, the example platform memory controller 426 of the example edge platform 422 manages local memory resources of the example platform local memory 428, communicates with the example remote secured and power grid platform 450 via an example first communication channel 464, and facilitates transfer of requests, information, and/or payloads between the example device platform 402, the example edge platform 422, and/or the example remote secured and power grid platform 450. In some examples, the example platform memory controller 426 sends requests to the example remote secured and power grid platform 450 to access a memory region (e.g., a memory range or a memory line), to map a first node (e.g., the example device platform 402) to a memory region in which the example edge platform 422 is already mapped, or to request exclusive access to a memory region in the secure pooled memory 456. In some examples, the example device platform includes expanded operating system (OS) mechanisms (e.g. malloc and/or malloca) to allocate memory to memory regions. In some examples, the example edge platform 422 receives access grants and/or denials to the memory region from the example remote secured and power grid platform 450, sends/receives encrypted payloads to/from the example remote secured and power grid platform 450, and/or receives private security keys (e.g., the example private symmetric keys 436, 438, 440) from the example remote secured and power grid platform 450 and/or a software stack (e.g., an orchestrator) to encrypt and/or decrypt the payloads sent/received to/from the remote secured and power grid platform 450. In some examples, the example private symmetric keys 436, 438, 440 are stored in an example security key register 434 for access by the example platform memory controller 426. In some examples, the example platform memory controller 426 encrypts a payload based on an example private symmetric key(s) 436, 438, 440.

The example edge platform 422 of the example edge computing system 400 illustrated in FIG. 4 includes an example platform caching agent (CA) 442 to communicate with the example remote secured and power grid platform 450 via an example second communication channel 466 to implement coherency protocols (e.g., MSI, MESI, MOSI, MOESI, MESIF, MOESIF, or any other suitable coherency protocol) between the example edge platform 422 (e.g., the example CPU 424 of the example edge platform 422) and the example secure pooled memory 456 of the example remote secured and power grid platform 450 during memory sharing operations (e.g., when multiple edge nodes are sharing a pooled memory region in the example secure pooled memory 456). In some examples, the example second communication channel 466 is shared between the example device platform 402, the example edge platform 422, and/or the example remote secured and power grid platform 450.

The example edge computing system 400 illustrated in FIG. 4 includes an example remote secured and power grid platform 450 (e.g., a remote server) that may be implemented in an example data center (e.g., the data center 120 illustrated in FIG. 1). In some examples, the example remote secured and power grid platform 450 is implemented at the data center layer (e.g., the example layer 240 illustrated in FIG. 2). In some examples, the example remote secured and power grid platform 450 includes example secure pooled memory 456 to store data, algorithms, and/or other information. In some examples, the example secure pooled memory 456 forms a pooled local memory. In some examples, the example secure pooled memory 456 includes DIMMs to provide memory and storage resources to multiple edge nodes (e.g., the example device platform 402 and/or the example edge platform 422) in a multi-tenant network. In some examples, the DIMMs implement DDR, DRAM, or other non-volatile memory technology. In some examples, the example remote secured and power grid platform 450 includes an example secure pooled memory controller 454 (e.g., a 5G pooled DIMM controller) to manage memory resources in the example remote secured and power grid platform 450 and facilitate transfer of information between the example remote secured and power grid platform 450, the example edge platform 422, and/or the example device platform 402. In some examples, the example remote secured and power grid platform 450 includes an example remote caching agent (CA) 452 to communicate with the example edge platform 422 and the example device platform 402 via an example second communication channel 466. In some examples, the example remote CA 452 sends snoops (e.g., snoop probes) to the example device platform 402 and the example edge platform 422 and/or other communications associated with a coherency protocol between the example device platform 402, the example edge platform 422, and/or the example remote secured and power grid platform 450 via the example second communication channel 466. In some examples, the example remote secured and power grid platform 450 includes an example security controller 458 to generate and manage private security keys (e.g., example private symmetric keys 412, 436, 438, 440) corresponding to memory regions of the example secure pooled memory 456.

While the example edge system 400 illustrated in FIG. 4 includes an example device platform 402 (e.g., an example first node), an example edge platform 422 (e.g., an example second node), and an example remote secured and power grid platform 450, the example edge computing system 400 may include any number of example device platforms 402, example edge platforms 422, and/or remote secured and power grid platforms 450 arranged in any configuration among the various layers of the edge computing network. Further, the example device platforms 402, the example edge platforms 422, and/or the example remote secured and power grid platforms 450 may communicate via one communication channel (e.g., the example first communication channel 464 or the example second communication channel 466), more than two communication channels, or no communication channels. In some examples, communication between the example device platform 402, the example edge platform 422, and the example remote secure and power grid platform 450 may be facilitated by one or more edge management nodes (e.g., an orchestrator). In some examples, the example edge management node (e.g., orchestrator 530 of FIG. 5) generates, provides, registers, and/or manages the distribution of private security keys (e.g., private security keys 412, 436, 438, 440) to the example device platform 402 and/or the example edge platform 422. In some examples, an example edge management node (e.g., the example orchestrator 530 of FIG. 5) migrates memory from the example secure pooled memory 456 encrypted with a first private security key 412, 436, 438, 440 to a local memory (e.g., the example device local memory 408 and/or the example platform local memory 428) and registers the private security key 412, 436, 438, 449 the example local memory 408, 428.

Figure 5:
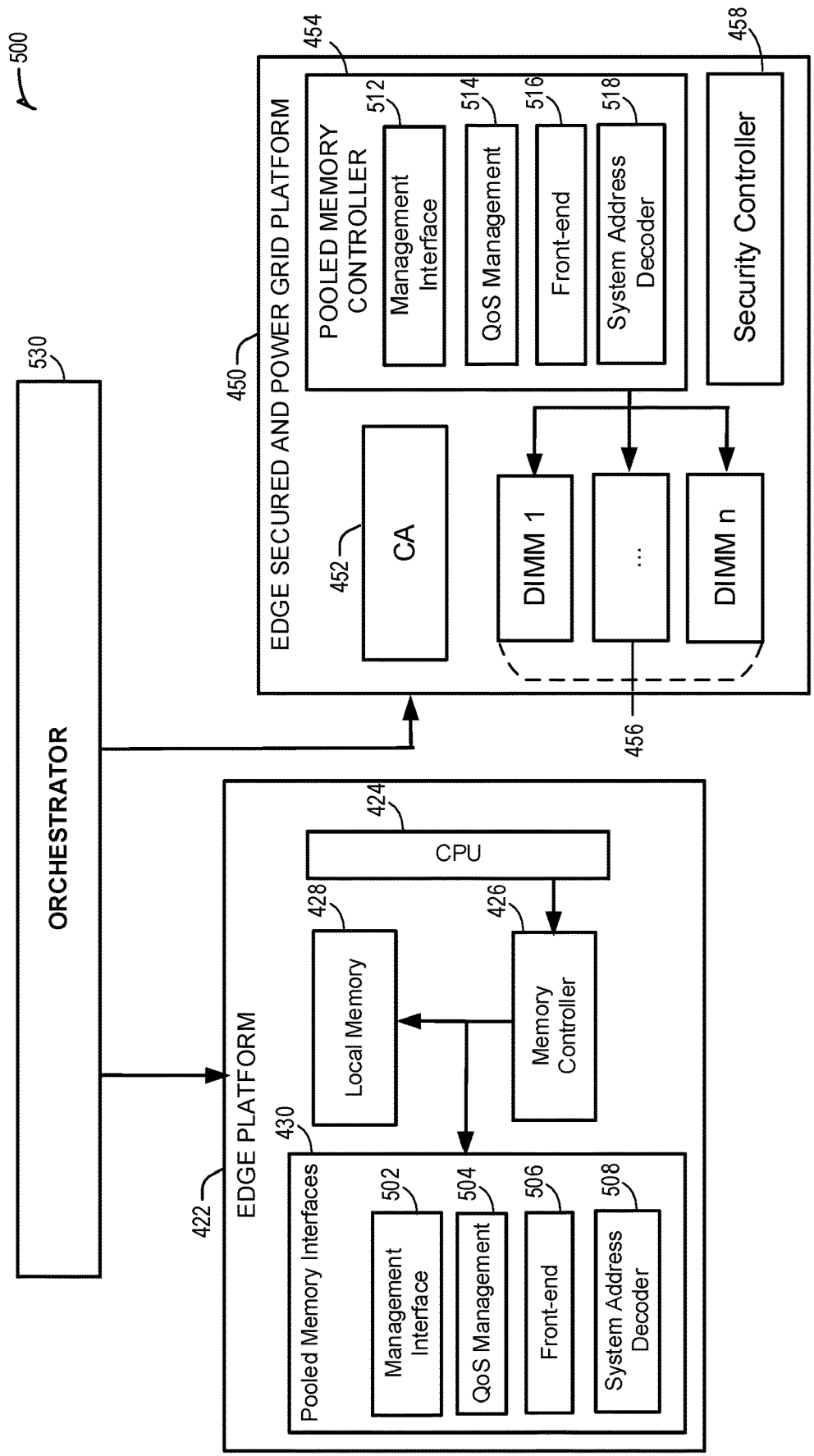
FIG. 5 is a block diagram illustrating the example remote secured and power grid platform of FIG. 4 to enable secure pooled memory sharing in an edge computing network in accordance with teachings of this disclosure.

FIG. 5 is a block diagram illustrating the example remote secured and power grid platform 450 of FIG. 4 in communication with the example edge platform 422 of FIG. 4. While the example diagram of FIG. 5 illustrates the example remote secured and power grid platform 450 in communication with the example edge platform 422, in some examples, the example remote secured and power grid platform 450 is in communication with the example device platform 402 (FIG. 4) instead of or in addition to the example edge platform 422.

In the example illustrated in FIG. 5, the example remote secure and power grid platform 450 and the example edge platform 422 are communicatively coupled by an example orchestrator 530 to enable secure memory sharing across a multi-tenant edge computing network. In some examples, the example remote secured and power grid platform 450 and the example edge platform 422 communicate via an example first communication channel 464 and/or an example second communication channel 466 via the example orchestrator 530.

The example edge platform 422 illustrated in FIG. 5 includes example edge pooled memory interfaces 430. In some examples, the example platform memory controller 426 manages memory resources in the example platform local memory 428 and/or memory access requests from the example CPU 424 to read/write to/from the example platform local memory 428.

Example edge pooled memory interfaces 430 of the example edge platform 422 include an example platform management interface 502 to communicate with an edge management component (e.g., the example orchestrator 530 illustrated in FIG. 5) and/or the example remote secures and power remote platform 450 to allocate, share, and/or delete memory in the example platform local memory 428 of the example edge platform 422. In some examples, the example platform management interface 502 includes expanded operating system (OS) mechanism (e.g., malloc and/or malloca) to allocate memory to memory regions (e.g., the example secure pooled memory 456). In some examples, the example platform management interface 502 of the example edge platform 422 communicates with the example remote management interface 512 of the example remote secured and power grid platform 450 to coordinate allocation, sharing, and/or deletion of memory in the example platform local memory 428. In some examples, the example platform management interface 502 and/or the example remote management interface 512 are accessible using out-of-band interfaces.

Example edge pooled memory interfaces 430 of the example edge platform 422 include an example platform QoS management interface 504 to manage requests (e.g., memory access requests) in accordance with QoS standards and/or SLAs associated with the example edge platform 422. In some examples, the example platform QoS management interface 504 determines whether a request can be issued to a remote edge location (e.g., the example remote secured and power grid platform 450) and/or whether a another request(s) has a higher priority based on QoS standards and/or SLA(s). In some examples, the example platform QoS management interface 504 communicates with the example secure QoS management interface 514 of the example secure power grid platform 450 to coordinate request priorities in accordance with QoS standards and/or SLAs.

Example edge pooled memory interfaces 430 of the example edge platform 422 include an example platform front-end interface 506 to communicate with the example remote secured and power grid platform 450 to send requests and/or to send/receive payloads via an example first communication channel 464 (FIG. 4). In some examples, the requests are for shared access, exclusive access, and/or ownership of a memory region. In some examples, the example platform front-end interface 506 secures a payload corresponding to a memory region (e.g., based on a CXL protocol), tunnels the payload to the example remote secured and power grid platform 450 via the example first communication channel 464 (e.g., CXL.mem channel), and forwards a response from the example remote secured and power grid platform 450 to the software stack of the example device platform 402. In some examples, the example platform front-end interface 506 of the example edge platform 422 communicates with the example remote front-end interface 516 of the example remote secured and power grid platform 450 to coordinate memory requests and/or secure payload transfers.

Example edge pooled interfaces 430 of the example edge platform 422 include an example edge system address decoder (SAD) 508. In some examples, the example edge SAD 508 maps a memory region to the example remote secured and power grid platform 450. In some examples, the example edge SAD 508 stores information based on the mapping of a memory region to the example remote secured and power grid platform 450. In some examples, the example edge SAD 508 stores an address range corresponding to the mapped memory region, an address of the example remote secured and power grid platform 450 platform hosting the mapped memory region, and/or credentials of the example remote secured and power grid platform 450 to securely send data (e.g., encrypted data) corresponding to the mapped memory region.

In some examples, the example edge SAD 508 identifies a platform (e.g., the example remote secured and power grid platform 450) that owns a mapped memory region in response receiving a request from the example CPU 424. In some examples, the example edge SAD 508 generates a software interrupt in response to an error (e.g., determining a device and/or platform is not mapped to a corresponding memory region and/or a mapped device corresponding to the memory region does not exist or is non-functional). In some examples, the example edge SAD 508 manages private security keys (e.g., example security keys 412, 436, 438, 440 (FIG. 4)) provided to mapped devices and/or platforms (e.g., the example edge platform 422). In some examples, an example orchestration management entity (e.g., the example orchestrator 530) provides the example edge SAD 508 with a list of edge devices/appliances having access to a remote memory region, a remote memory region ID corresponding to the remote memory region, and/or private security keys (e.g., private security keys 412, 436, 43, 440 (FIG. 4)) corresponding to the remote memory region.

Thus, the example edge SAD 508 of the example edge platform 508 enables the example platform memory controller 426 to specify a memory region hosted by the example secure pooled memory 456 of the example remote secured and power grid platform 450, determine the amount of memory available in the example secure pooled memory 456, and/or determine properties and characteristics of memory available in the example secure pooled memory 456 (e.g., latencies, bandwidths, etc.)

In some examples, the example remote secured and power grid platform 450 provides remote compute, memory, and storage resources for applications and/or services running on the example edge platform 422. In some examples, the example remote secured and power grid platform 450 provides shared memory capabilities to the example edge platform 422 and/or an example device platform (e.g., the example device platform 402 of FIG. 4) via secure pooled memory 456 and enables applications and/or services on different platforms (e.g., the example device platform 402 (FIG. 4) and/or the example edge platform 422) with different operating parameters and/or characteristics (e.g., latency parameters, bandwidth parameters, or other suitable operating parameters) to share memory resources.

The example remote secured and power grid platform 450 illustrated in FIG. 5 includes example secure pooled memory 456 to store data, algorithms, or other information. In some examples, the example secure pooled memory 456 includes PMEM (e.g., DIMMs). In some examples, the DIMMs implement DDR, DRAM, or other non-volatile memory capabilities. In some examples, the example secure pooled memory 456 is divided into memory regions (e.g., a memory range or range of memory addresses). In some examples, the memory regions in the example secure pooled memory 456 is divided into subregions (e.g., memory lines and/or memory blocks). In some examples, the example secure pooled memory 456 is shared by multiple applications and/or services running on different edge nodes (e.g., the example device platform 402 (FIG. 4) and/or the example edge platform 422). In some examples, the example secure pooled memory 456 enables different applications running on different example edge nodes 402 (FIG. 40, 422 to access memory regions according to memory region properties and/or characteristics such as latency parameters, bandwidth parameters, or any other suitable memory operating parameter.

The example remote secured and power grid platform 450 illustrated in FIG. 5 includes an example secure pooled memory controller 454 to manage memory resources in the example secure pooled memory 456 and receive access requests from the example edge platform 422 and/or the example device platform 402 (FIG. 4). In some examples, the example secure pooled memory controller 454 receives a request from the example edge platform 422 for the example remote secured and power grid platform 450 to map the example device platform 402 (FIG. 4) to a memory region in which the example edge platform 422 is already mapped to. In some examples, the example secure pooled memory controller 454 communicates with the example edge platform 422 via an example first communication channel 464 to receive an access request from the example platform memory controller 426 of the example edge platform 422, send memory access grants and/or denials to the example platform memory controller 426, send/receive secure payloads to/from the example memory controller 426, and/or send private security keys to the example platform memory controller 426 of the example edge platform 422 in response to mapping a the example device platform 402 (FIG. 4) to a memory region in the example secure pooled memory 456 to which the example edge platform 422 is mapped.

The example secure pooled memory controller 454 of the example remote secured and power grid platform 450 illustrated in FIG. 5 includes an example remote front-end interface 516. In some examples, the example remote front-end interface 516 communicates with the example edge pooled memory interfaces 430 via an example first communication channel 464 (FIG. 4). In some examples, the example remote front-end interface 516 receives access requests from the example edge platform 422. In some examples, the access requests are for shared access, exclusive access, and/or ownership of a memory region. In some examples, the example first communication channel 464 is a secure wireless communication channel (e.g., a 5G wireless channel). In some examples, the example first communication channel 466 is a CXL.mem channel that implements a component library for cross-platform (e.g., Compute Express Link (CXL)) framework or any other suitable secure wireless framework.

The example secure pooled memory controller 454 of the remote secure power grid platform 450 illustrated in FIG. 5 includes an example remote system address decoder (SAD) 518. In some examples, the example remote SAD 518 maps a memory region (e.g., a memory ranges or memory ranges) to edge node(s) granted rights or access to the memory region (e.g., the example edge platform 422 and/or the example device platform 402 of FIG. 4). In some examples, the example remote SAD 518 includes a memory region (e.g., an address range) mapped to the example edge platform 422, an address of the example edge platform 422 mapped to the memory region, and/or credentials of the example edge platform 422 mapped to the memory region to securely send/receive payloads (e.g., based on an example private security key 412, 436, 438, 440). In some examples, the example remote SAD 518 includes an address range mapped to the example edge platform 422 and an address range mapped to the example device platform 402 (FIG. 4), an address of the example edge platform 422 mapped to the memory region and an address of the example device platform 402 (FIG. 4) mapped to the memory region, and/or credentials of the example edge platform 422 and the example device platform 402 (FIG. 4) mapped to the memory region to securely send/receive payloads (e.g., based on example private security keys 412, 436, 438, 440). In some examples, the example remote pooled memory controller 454 illustrated in FIG. 5 receives a request from an example edge platform 422 to map an example device platform 402 (FIG. 4) to a memory region in which the example edge platform 422 is mapped. In some examples, the example remote SAD 518 maps the example device platform 402 (FIG. 4) to the memory region in response to the request from the example edge platform 422. In some examples, the example remote SAD 518 maps a private security key (e.g., example private security key 412) provided to the example device platform 402 (FIG. 4) to the memory region in response to the request from the example edge platform 422.

The example remote pooled memory controller 454 illustrated in FIG. 5 includes an example remote management interface 512 to communicate with the example edge platform 422 and/or the example device platform 402 (FIG. 4) and edge management nodes (e.g., the example orchestrator 530 of FIG. 5). In some examples, the example remote management interface 512 includes expanded operating system (OS) mechanisms (e.g., malloc and/or malloca) to allocate memory to memory regions (e.g., the example secure pooled memory 456 of the example remote secured and power grid platform 450). In some examples, the example remote management interface 512 communicates with an example orchestrator 530 to manage the allocation, sharing, and deletion of memory in the example edge platform 422 and/or the example device platform 402.

The example remote pooled memory controller 454 illustrated in FIG. 5 includes an example remote QoS interface 514 to manage requests, e.g., access requests, from the example edge platform 422 in accordance with QoS standards and/or SLAs between the network provider and the service provider associated with the example edge platform 422. For example, the example remote QoS interface 514 may determine a priority of a first request with respect to a second request based on a corresponding QoS standard or SLA and/or queue the first memory request and second request according to the determined priority. In some examples, the example remote QoS interface 514 communicates with an external QoS and/or SLA database to identify the QoS standards and/or SLAs for the corresponding edge node (e.g., the example edge platform 422 and/or the example device platform 402 (FIG. 4)).

The example secure power grid platform 450 illustrated in FIG. 5 includes an example security controller 458 to generate a private key in response to the example secure pooled memory controller 454 mapping an example device platform 402 (FIG. 4) and/or an example edge platform 422 to a memory region in the example secure pooled memory 456. In some examples, the example secure pooled memory controller 454 receives a request from the example edge platform 422 to map the example device platform 402 (FIG. 4) to a memory region in the example secure pooled memory 456 to which the example edge platform 422 is mapped. In some examples, in response to receiving a request to map the example device platform 402 (FIG. 4) to the memory region in the example secure pooled memory 456, the example security controller 458 validates that the example edge platform 422 has rights to the requested memory region (e.g., read rights, write rights, and/or read/write rights). In some examples, in response to determining the example edge platform 422 has rights to the requested memory region, the example secure pooled memory controller 454 maps the example device platform 402 (FIG. 4) to the memory region, stores the memory address range of the memory region in the example remote SAD 518, stores the address of the example edge platform 422 mapped to the memory region and the address of the example device platform 402 (FIG. 4) mapped to the memory region in the example remote SAD 518, and/or stores credentials of the example edge platform 422 and credentials of the example device platform 402 (FIG. 4) corresponding to the memory region to securely send/receive payloads to/from the example secure pooled memory controller 454.

In some examples, in response to the example secure pooled memory controller 454 mapping the example device platform 402 (FIG. 4) to the example memory region, the example security controller 458 of the example remote secured and power grid platform 450 generates a private security key (e.g., the example private security key 412 of FIG. 4) corresponding to the memory region and sends the example private security key 412 to the example device platform 402 (FIG. 4) mapped to the memory region. In some examples, the example private security key 412 enables the example device platform 402 (FIG. 4) to encode and/or decode encrypted payloads from the example remote secured and power grid platform 450 and send/receive the encrypted payloads to/from the example remote secured and power grid platform 450. In some examples, the example private security key 412 corresponds to the example private security key 436 of the example edge platform 422. In some examples, the example private security key 412 is a symmetric security key. In some examples, the private security is implemented via a multi-key total memory encryption (MKTME) protocol. In some examples, the example remote SAD 518 stores copies of the generated private security keys (e.g., for disaster recovery).

Thus, the example remote secured and power grid platform 450 enables multiple edge nodes (e.g., the example edge platform 422 and the example device platform 402 (FIG. 4)) to share memory regions located in the example secure pooled memory 456 of the example remote secured and power grid platform 450. In addition, the example remote secured and power grid platform 450 enables multiple example edge nodes 422, 402 (FIG. 4) to securely share remote memory regions by generating private security keys (e.g., private symmetric key 412 of the example device platform 402 (FIG. 4) and private symmetric keys 436, 438, 440 of the example edge platform 422) corresponding to the remote shared memory region and sending the corresponding private security keys 412, 436, 438, 440 to the corresponding example edge nodes 422, 402 (FIG. 4) mapped to the remote shared memory region. In addition, the example remote secured and power grid platform 450 illustrated in FIGS. 4-6 encrypts payloads sent to the mapped example edge nodes 422, 402 (FIG. 4) based on the example private security keys 412, 436, 438, 440 such that only the example edge nodes 422, 402 (FIG. 4) mapped to the example memory region can decrypt the encrypted payloads sent by the example remote secured and power grid platform 450. Further, the example platform memory controller 426 of the example edge platform 422 mapped to the secure remote memory region and the example device memory controller 406 of the example device platform 402 (FIG. 4) mapped to the secure remote memory region are configured to encrypt payloads corresponding to the memory region based on a corresponding private security key 412, 436, 438, 440 such that only the example remote secured and power grid platform 450 and example edge nodes 422, 402 (FIG. 4)

with a private security key 412, 436, 436, 440 corresponding to the memory region can decrypt and read the payload. In some examples, an example software stack(s) (e.g., the example orchestrator 530 of FIG. 5) manages and/or provides one or more of the private security keys via secure communication channel (e.g., the example first communication channel 464 (FIG. 4) and/or the example second communication channel 466 (FIGS. 4 and 6), thus allowing flexibility in the management, tracking, and security of the example private security keys 412, 436, 438, 440 (FIG. 4).

Figure 6:
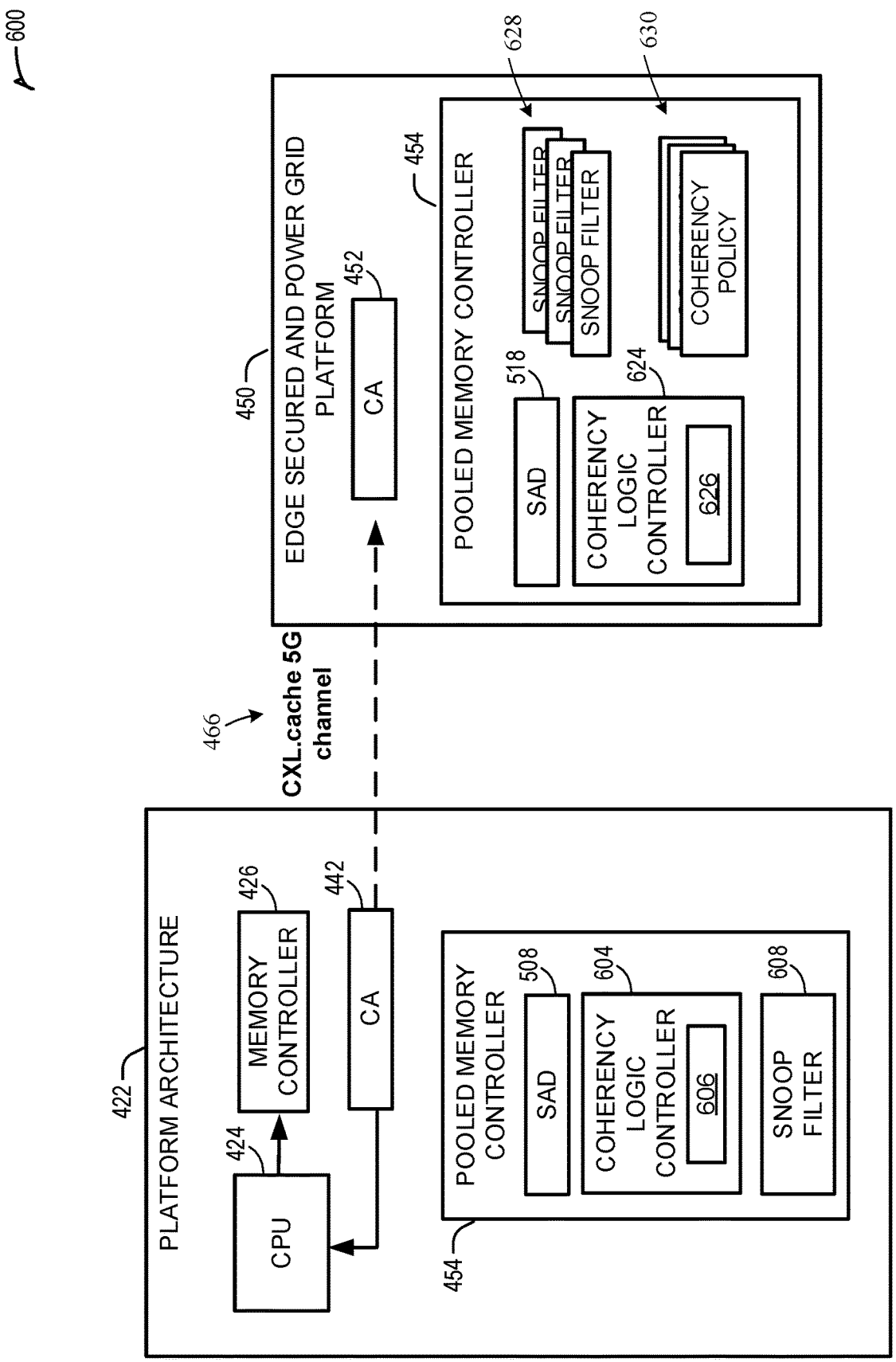
FIG. 6 is a block diagram of the example remote secured and power grid platform of FIGS. 4 and 5 to implement to enable secure pooled memory sharing in an edge network.

FIG. 6 is a block diagram of the example remote secured and power grid platform 450 of FIGS. 4 and 5 to enable secure pooled memory sharing in an edge network. In some examples, the example remote secured and power grid platform 450 implements a secure coherency protocol by controlling access to an example memory region shared by an example edge platform 422 and an example device platform 402 (FIG. 4).

In some examples, the example remote secured and power grid platform 450 includes an example remote caching agent (CA) 452 to manage accesses performed by the example CPU 424 of the example edge platform 422. In some examples, the example CA 452 implements a coherency protocol via an example second communication channel 466. In some examples, the example second communication channel 466 is a secure 5G wireless communication channel. In some examples, the example second communication channel 466 is CXL.cache channel that implements a CXL framework.

In examples disclosed herein, a cache coherency protocol keeps coherency between memory regions (e.g., memory lines, memory blocks, memory contents, etc.) across different devices in an edge computing network. Example coherency protocols include MSI, MESI, MOSI, MOESI, MESIF, MOESIF, etc. In some examples, the example secure coherency protocol implemented by the example remote CA 452 includes sending, by the example remote CA 452, a snoop probe to the example edge platform 422 and the example device platform 402 (FIG. 2) in response to detecting a transaction request (e.g., a request to read, a request to write, or a request to upgrade to/from the example secure pooled memory 456) from the example edge platform 422. In some examples, in response to the snoop probe returning an indication that a write operation is observed on the example edge platform 422 having a copy of data corresponding to the shared memory region, the example remote CA 452 instructs the example device platform 402 (FIG. 4) to invalidate the corresponding copy of data in the example device local memory 408 by, for example, marking the data invalid (e.g., a write-invalidate operation). In such examples, upon receipt of a subsequent access request for the same data, the invalidating of that data causes the example device platform 402 to request (e.g., a read request) corresponding new data from the example secure pooled memory 456 in the example remote secured and power grid platform 450. In some examples, in response to the snoop probe returning an indication that a write operation is observed on the example edge platform 422 having a copy of data corresponding to the shared memory region, the example remote CA 452 instructs the example device memory controller 406 of the example device platform 402 (FIG. 4) to update a copy of data in the example device local memory 408 with corresponding new data requested from (e.g., via a read request) the example secure pooled memory 456 in the example remote secured and power grid platform 450 (e.g., a write-update operation).

In some examples, the example remote CA 452 determines whether an example device platform 402 (FIG. 4) mapped to a shared memory region is accessing the shared memory region in response to a request from the example edge platform 422 also mapped to the shared memory region to access the shared memory region. In some examples, in response to determining that the example device platform 402 (FIG. 4) is not accessing the shared memory region, the example remote CA 452 responds to the access request by following a coherency protocol (e.g., Ack go exclusive) and, if the access request from the example edge platform 422 is a read request, provides a secure payload to the example device platform 402 (FIG. 4). In some examples, in response to determining that the example device platform 402 (FIG. 4) is accessing the shared memory region, the example remote CA 452 implements a coherency protocol (e.g., sends snoops to the example device platform 402 (FIG. 4) and/or the example edge platform 422 via the example first communication channel and/or the example second communication channel and/or monitors the example first communication channel and/or the example second communication channel for accesses by the example device platform 402 (FIG. 4) and/or the example edge platform 422). In some examples, a secure payload is sent to the example edge platform 422 in accordance with the implemented coherency protocol.

In some examples, the example remote CA 452 implements a coherency protocol via an example coherency logic controller 624. In the example remote secured and power grid platform 450 illustrated in FIG. 5, the example coherency logic controller 624 is located in the example remote pooled memory controller 454. In some examples, the example coherency logic controller 624 implements example coherency logic 626. In some examples, the example coherency logic 626 corresponds to an example coherency policy 630 stored in the example remote pooled memory controller 454 and/or in local memory of the example remote secure and power grid platform 450. In some examples, the example coherency protocol is any suitable coherency protocol to facilitate access to a shared memory region by two or more edge nodes (e.g., the example edge platform 422 and/or the example device platform 402 (FIG. 4)). For example, a suitable coherency protocol may ensure that a first edge node and second edge node always have the same view of a shared memory region during shared memory access. In some examples, the example coherency protocol may be a snoop-based protocol (e.g., a modified, shared, invalid (MSI) protocol, a modified, exclusive, shared, invalid (MESI) protocol, a modified, owned, shared, invalid (MOSE) protocol, and/or any other suitable coherency protocol). In some examples, the example coherency protocol may be a write-invalidate protocol (e.g., a MESI protocol) or a write-update protocol. In some examples, the example remote secured and power grid platform 450, the example edge platform 422, and/or the example device platform 402 (FIG. 4) negotiate the type of coherency protocol to be implemented by the example remote CA 452.

In some examples, the example remote CA 452 implements a coherency policy by sending snoops (e.g., snoop probes) to the example edge platform 422 and/or the example device platform 402 to monitor the example first communication channel 464 and/or the example second communication channel for memory accesses by the example edge platform 422 and/or the example device platform 403 (FIG. 4). In some examples, a snoop determines whether or not the example edge platform 422 and/or the example device platform 402 (FIG. 4) is accessing a memory region and/or a copy of data corresponding to the memory region.

The example remote pooled memory controller 454 illustrated in FIG. 6 includes example snoop filters 628 associated with an example snoop-based coherency logic 626. In some examples, the example remote CA 452 implements a snoop-based coherency protocol based on the example snoop coherency logic 626. In some examples, the example remote CA 452 sends snoops (e.g., via the example snoop filters 628) to the example edge platform 422 and/or the example device platform 402 (FIG. 4) to identify a data change in a shared memory region and/or update the other example local memories 408, 428 (FIG. 4) mapped to the shared region of the data change. In some examples, In some examples, the example remote CA 452 implements the snoop-based coherency protocol using example snoop filters to monitor coherent traffic and/or keep track of coherency states of local memories (e.g., the example device local memory 408 of FIG. 4 and/or the example platform local memory 428 of FIG. 4). In some examples, the example snoop filters 628 monitor the example first communication channel 464 and/or the example second communication channel 466 to determine whether the example edge platform 422 and/or the example device platform 402 (FIG. 4) is/are accessing a shared memory region. In some examples, the example snoop filters 628 determine whether an example local memory 408, 428 (FIG. 4) is accessing a copy of data corresponding to a memory region. In some examples, if the example snoop filters 628 determine that an example local memory 408, 428 (FIG. 4) is accessing a copy of data corresponding to the shared memory region, the example snoop filters 628 communicate to the example remote CA 452 to send a snoop request to the corresponding example local memory 408, 428 (FIG. 4). In some examples, if the example snoop filters 628 determine that an example local memory 408, 428 (FIG. 4) is not accessing a copy of a shared memory region, the example snoop filters 628 communicate to the example remote CA 452 to refrain from sending a snoop request to the corresponding example local memory 408, 428 (FIG. 4). In some examples, in response to a snoop request from the example remote CA 452 identifying a data change, the example remote CA 452 updates the other local memories 408, 428 (FIG. 4) of edge nodes mapped to the shared memory region.

The example edge platform 422 illustrated in FIG. 6 includes an example platform caching agent (CA) 442 to communicate with the example remote CA 452 of the example remote secured and power grid platform 450 to implement a coherency protocol in response to receiving an instruction from the example remote CA platform 452 via an example second communication channel 466 (FIG. 4). In some examples, the example platform pooled memory controller 426 of the example edge platform 422 includes an example coherency logic controller to implement the coherency protocol in response to the instruction from the example remote CA 452. In some examples, the example coherency logic 606 is snoop-based coherency logic. In some examples, the example platform pooled memory controller 426 includes an example snoop filter 608 to determine whether the example platform local memory 428 is accessing a shared memory region and/or is accessing a copy of data corresponding to a shared memory region and notify the example remote CA 452 in response to determining the example platform local memory 428 has a copy of data corresponding to the memory region. In some examples, the example snoop filter includes a status of the memory region being accessed by the example edge platform 422 and/or the example device platform 402 (FIG. 4).

Thus, the example remote secured and power grid platform 450 enables coherency of a shared memory region in the example secure pooled memory 456 by implementing a coherency protocol via an example second communication channel 466 (e.g., an example secure CXL.cache channel implementing a CXL framework).

While an example manner of implementing the example device platform 402, the example edge platform 422, and the example remote secured and power grid platform 450 illustrated in FIGS. 4-6, one or more of the elements, processes and/or devices illustrated in FIGS. 4-6 may be combined, divided, re-arranged, omitted, eliminated and/or implemented in any other way. Further, the example SoC 404, the example device memory controller 406, example platform pooled memory interfaces 410, the example device CA 414, the example CPU 424, the example platform memory controller 426, example edge pooled memory interfaces 430, example pooled local memory interfaces 432, the example edge CA 442, the example remote pooled memory controller 454, the example security controller 456, the example remote CA 452, and/or, more generally, the example device platform 402 of FIG. 4, the example edge platform 422 of FIGS. 4-6, and the example remote secured and power grid platform 450 of FIGS. 4-6 may be implemented by hardware, software, firmware and/or any combination of hardware, software and/or firmware. Thus, for example, any of the example SoC 404, the example device memory controller 406, example platform pooled memory interfaces 410, the example device CA 414, the example CPU 424, the example platform memory controller 426, example pooled memory interfaces 430, example edge pooled local memory interfaces 432, the example edge CA 442, the example remote pooled memory controller 454, the example security controller 456, the example remote CA 452 and/or, more generally, the example device platform 402 of FIG. 4, the example edge platform 422 of FIGS. 4-6, and/or the example remote secured and power grid platform 450 of FIGS. 4-6 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device (s) (FPLD(s)). When reading any of the apparatus or system claims of this patent to cover a purely software and/or firmware implementation, at least one of the example SoC 404, the example device memory controller 406, example platform pooled memory interfaces 410, the example device CA 414, the example CPU 424, the example platform memory controller 426, example pooled memory interfaces 430, example pooled local memory interfaces 432, the example edge CA 442, the example remote pooled memory controller 454, the example security controller 456, and the example remote CA 452 are hereby expressly defined to include a non-transitory computer readable storage device or storage disk such as a memory, a digital versatile disk (DVD), a compact disk (CD), a Blu-ray disk, etc. including the software and/or firmware. Further still, the example device platform 402 of FIG. 4, the example edge platform 422 of FIGS. 4-6, and/or the example secured and power grid platform 450 of FIGS. 4-6 remote secured and power grid platform may include one or more elements, processes and/or devices in addition to, or instead of, those illustrated in FIGS. 4-6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example device platform 402 of FIG. 4, the example edge platform 422 of FIGS. 4-6, and/or the example remote secured and power grid platform 450 of FIGS. 4-6 are shown in FIGS. 7-10. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 7-10, many other methods of implementing the example device platform 402 of FIG. 4, the example edge platform 422 of FIGS. 4-6, and/or the example remote secured and power grid platform 450 of FIGS. 4-6 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 7:
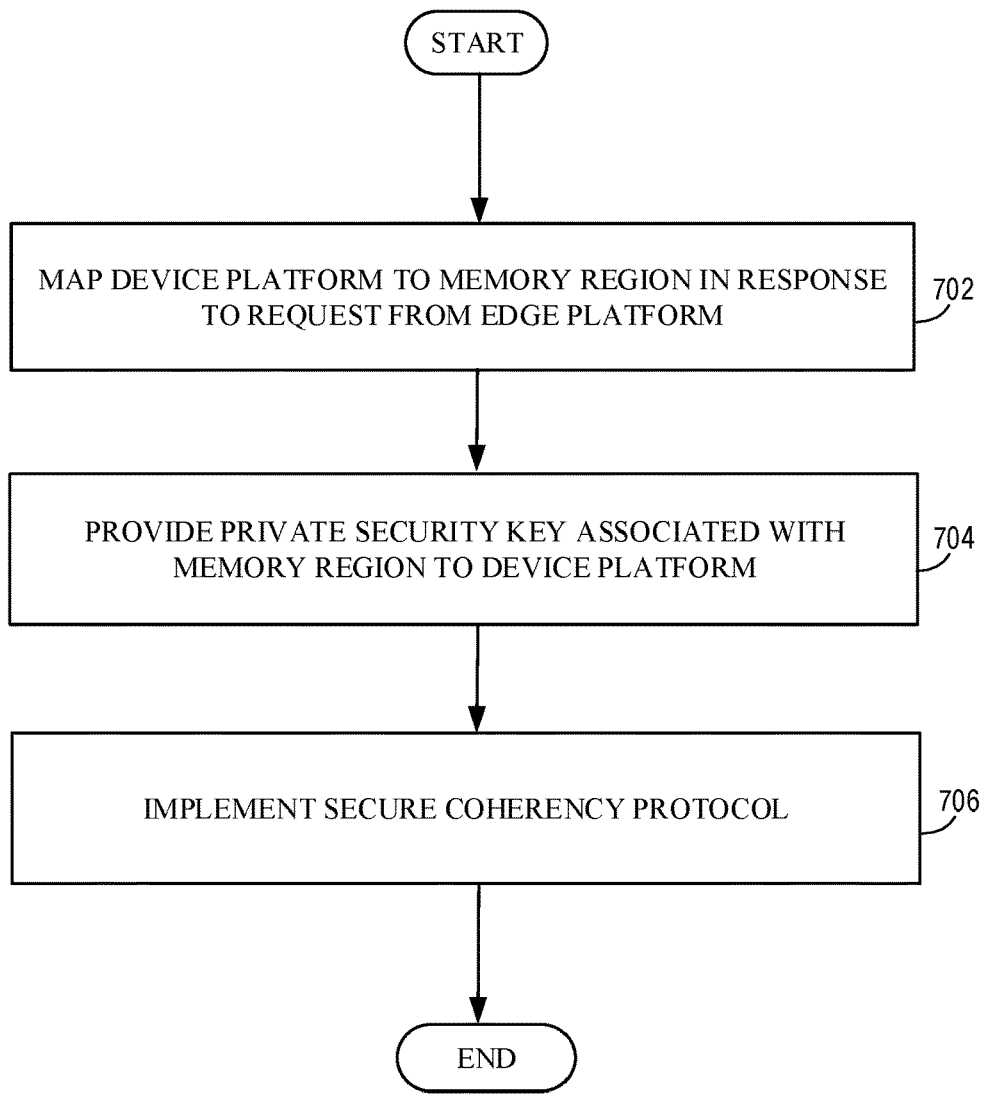
FIG. 7 is a flowchart representative of example machine readable instructions which may be executed to implement the example remote secured and power grid platform FIGS. 4-6 to enable secure pooled memory access in a multi-tenant edge network.

FIG. 7 is a flowchart representative of example machine readable instructions 700 which may be executed to implement the example remote secured and power grid platform 450 of FIGS. 4-6 to enable secure pooled memory access in multi-tenant edge network.

The example machine readable instructions 700 of FIG. 7 begin at block 702 at which an example secure pooled memory controller 454 (FIGS. 4-6) of the example remote secured and power grid platform 450 (FIGS. 4-6) maps the example device platform node 402 (FIG. 4) to a memory region in response to a request from the example edge platform node 422 (FIGS. 4-6). In some examples, the example edge platform node 422 (FIGS. 4-6) is already mapped to the memory region. In some examples, the example device platform node 402 (FIG. 4) is mapped to the memory region by an example system address decoder (SAD) 518 (FIGS. 5-6) of the example remote pooled memory controller 454 (FIGS. 4-6). In some examples, the example remote pooled memory controller 454 (FIGS. 4-6) receives the request from the edge platform node 422 via an example first communication channel 464 (FIG. 4).

At block 704, the example remote pooled memory controller 454 (FIGS. 4-6) of the example remote secured and power grid platform 450 (FIG. 4) provides a private security key (e.g., private symmetric security key 412 (FIG. 4) associated with the memory region to the example device platform node 402 (FIG. 4). In some examples, the private security key is a private symmetric security key (e.g., a private symmetric security key 412 of FIG. 4). In some examples, the example private symmetric security key 412 enables the example device platform node 402 (FIG. 4) to decrypt encrypted payloads corresponding to data in the shared memory region received from the example remote secured and power grid platform 450 and encrypt payloads corresponding to data in the shared memory region to send to the example remote secured and power grid platform 450. In some examples, the example private symmetric security key 412 of the example device platform node 402 (FIG. 4) corresponds to an example private symmetric security key 436 of the example edge platform node 422. In some examples, an example software stack(s) (e.g., the example orchestrator 530 of FIG. 5) provides the private security key via secure communication channel (e.g., the example first communication channel 464 (FIG. 4) and/or the example second communication channel 466 (FIGS. 4 and 6).

At block 706, the example remote caching agent (CA) 452 (FIG. 4) implements a secure coherency protocol to identify data changes in the copies of data associated with the shared memory region and to update other edge nodes mapped to the shared memory region based on the identified data changes. In some examples, the example remote CA 452 implements a snoop-based coherency protocol. In some examples, the example remote CA 452 implements the example coherency protocol via an example second communication channel 466 (FIGS. 4 and 6).

The example machine readable instructions 700 end.

Figure 8:
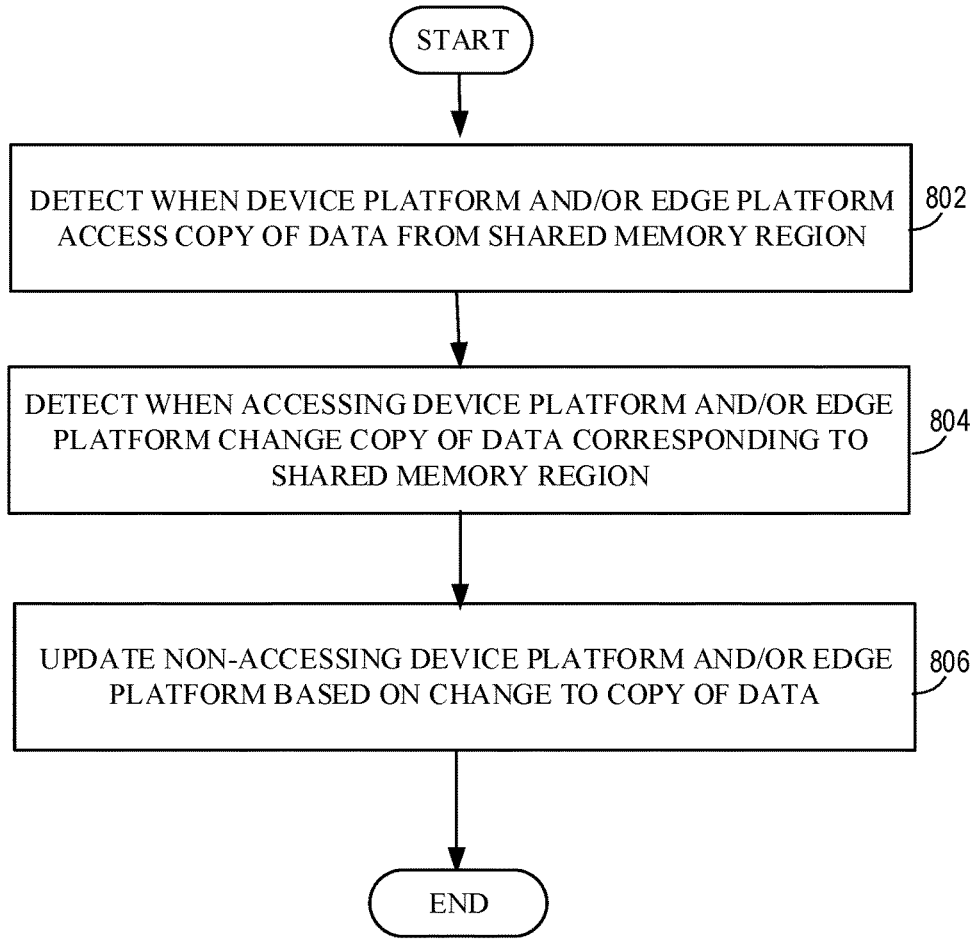
FIG. 8 is a flowchart representative of example machine readable instructions which may be executed to implement the example remote secured and power grid platform of FIGS. 4-6 to enable secure pooled memory access in a multi-tenant edge network.

FIG. 8 is a flowchart representative of example machine readable instructions 800 which may be executed to implement the example remote secured and power grid platform 450 of FIGS. 4-6 to enable secure shared memory access in a multi-tenant edge network.

The example machine readable instructions 800 of FIG. 8 begin at block 802 where the example remote caching agent (CA) 452 (FIGS. 4-6) detects when the example device platform 402 (FIG. 4) and/or the example edge platform 422 (FIG. 4) accesses a copy of data from a memory region in the example secure pooled memory 456 of the example remote secured and power grid platform 450 shared by the example device platform 402 (FIG. 4) and the example edge platform 422 (FIGS. 4-6). In some examples, the example device platform 402 (FIG. 4), the example edge platform 422 (FIGS. 4-6), and/or the example remote secured and power grid platform 450 (FIGS. 4-6) includes expanded operating system (OS) mechanisms (e.g., malloc and/or malloca) to allocate memory to the memory region.

At block 804, the example remote CA 452 (FIGS. 4-6) detects when the accessing example device platform 402 (FIG. 4) and/or example edge platform 422 (FIG. 4) changes the accessed copy of data corresponding to the shared memory region.

At block 806, the example remote CA 452 (FIG. 4) updates the non-accessing example device platform 402 (FIG. 2) or edge platform 422 (FIG. 4) based on the change to the copy of data.

The example machine readable instructions 800 end.

Figure 9:
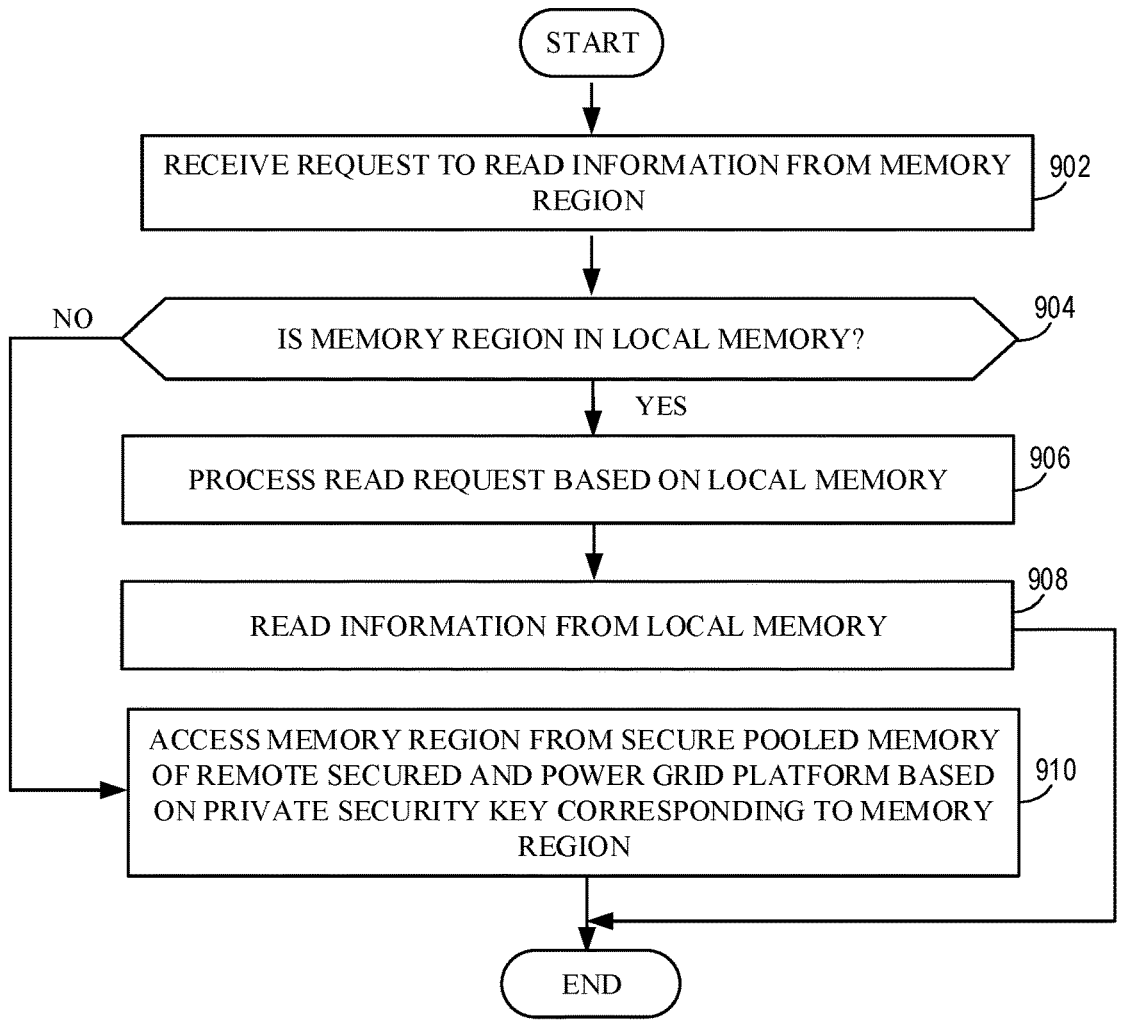
FIG. 9 is a flowchart representative of machine readable instructions which may be executed to implement the example device platform FIG. 4 to request access to read from a memory region on the example remote secured and power grid platform of FIGS. 4-6.

FIG. 9 is a flowchart representative of machine readable instructions 900 which may be executed to implement the example device platform 402 of FIG. 4 to request access to read from a memory region on the example remote secured and power grid platform 450 (FIGS. 4-6).

The example machine readable instructions 900 of FIG. 9 begin at block 902 where the example device memory controller 406 (FIG. 4) of the example device platform 402 receives an access request from the example device SoC 404 to read information from a memory region (e.g., a memory line) in the example device local memory 408.

At block 904, the example device memory controller 406 determines whether the requested memory region is located in the example device local memory 408 (FIG. 4) of the example device platform 402. If the example device memory controller 406 determines the requested memory region is located in the example device local memory 408 (e.g., a cache hit) (block 904), the example machine readable instructions advance to block 906 where the example device memory controller 406 processes the access request. At block 908, the example device SoC 404 reads the information from the memory region in the example device local memory 408.

If the example device memory controller 406 determines the requested memory region is not located in the example device local memory 408 (e.g., a cache miss) (block 904), the example device memory controller 406 of the example device platform 402 accesses the memory region from the example secure pooled memory 456 (FIGS. 4-5) of the example remote secured and power grid platform 450 based on a private security key (e.g., example private security key 412) corresponding to the memory region. For example, the example device (CA) 414 (FIG. 4) sends a memory access request (including the example private security key 412) to the example remote secured and power grid platform 450 via the example second communication channel 466. In this manner, the example remote secured and power grid platform 450 can process the access request to provide the example device platform 402 access to the identified memory region.

The machine readable instructions 900 end.

Figure 10:
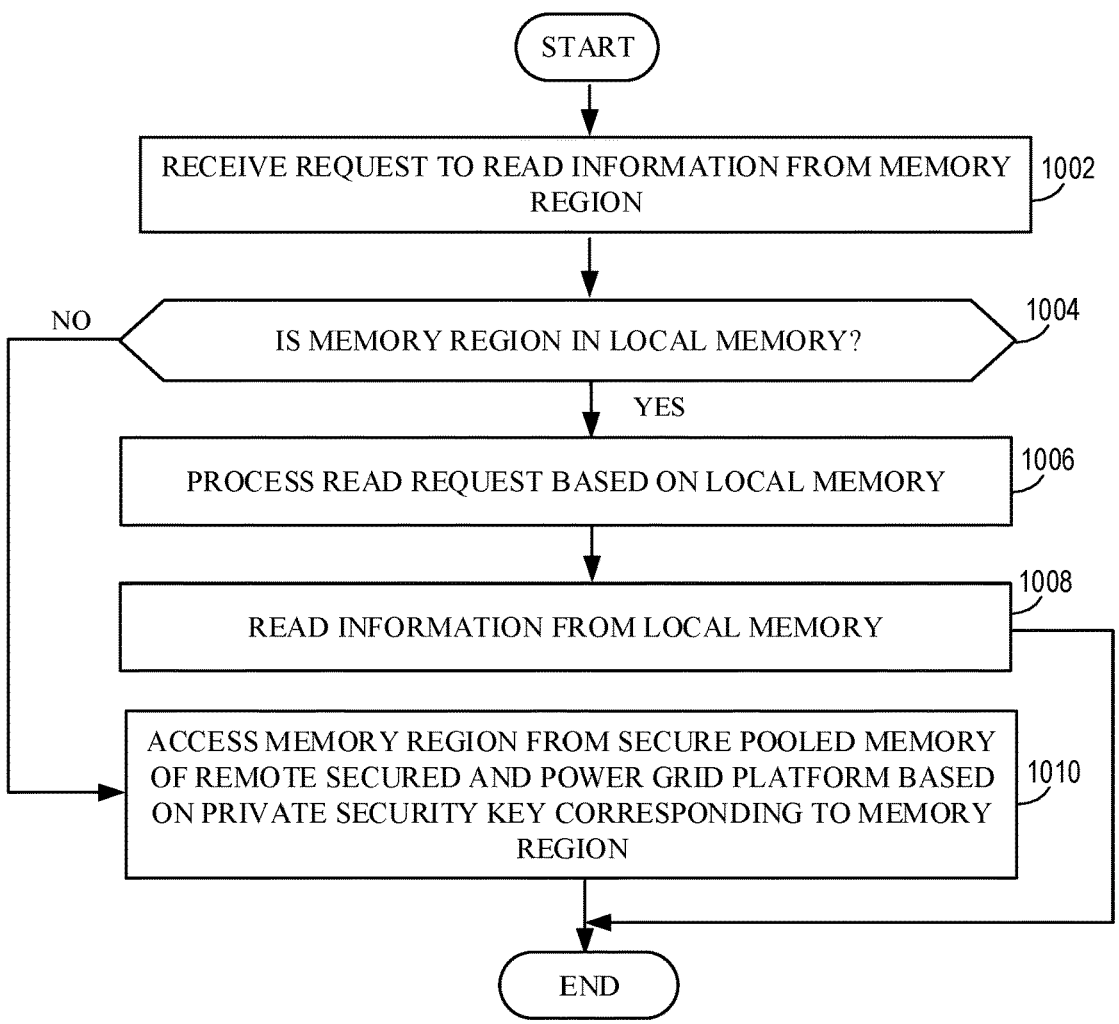
FIG. 10 is a flowchart representative of machine readable instructions which may be executed to implement the example edge platform of FIGS. 4-6 to request access to write to a memory region on the example remote secured and power grid platform FIGS. 4-6.

FIG. 10 is a flowchart representative of machine readable instructions 1000 which may be executed to implement the example edge platform 422 of FIGS. 4-6 to request access to write to a memory region on a remote secured and power grid platform 450 (FIGS. 4-6).

The example machine readable instructions 1000 of FIG. 10 begin at block 1002 where the example edge memory controller 426 (FIG. 4) of the example edge platform 422 receives an access request from the example device CPU 424 to read information from a memory region (e.g., a memory line) in the example edge local memory 428 (FIG. 4).

At block 1004, the example edge memory controller 426 determines whether the requested memory region is located in the example edge local memory 428 (FIG. 4) of the example edge platform 422. If the example edge memory controller 426 determines the requested memory region is located in the example edge local memory 428 (e.g., a cache hit) (block 1004), the example machine readable instructions advance to block 1006 where the example edge memory controller 406 processes the access request. At block 1008, the example device CPU 424 reads the information from the memory region in the example edge local memory 428.

If the example edge memory controller 426 determines the requested memory region is not located in the example edge local memory 428 (e.g., a cache miss) (block 1004), the example edge memory controller 426 of the example edge platform 422 accesses the memory region from the example secure pooled memory 456 (FIGS. 4-5) of the example remote secured and power grid platform 450 based on a private security key (e.g., example private security key 436, 438, 440) corresponding to the memory region. For example, the example platform CA 442 (FIG. 4) sends a memory access request (including the example private keys 436, 438, 440) to the example remote secured and power grid platform 450 via the example second communication channel 466. In this manner, the example remote secured and power grid platform 450 can process the access request to provide the example edge platform 422 access to the identified memory region.

The machine readable instructions 1000 end.

In further examples, any of the compute nodes or devices discussed with reference to the present edge computing systems and environment may be fulfilled based on the components depicted in FIG. 11. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 11:
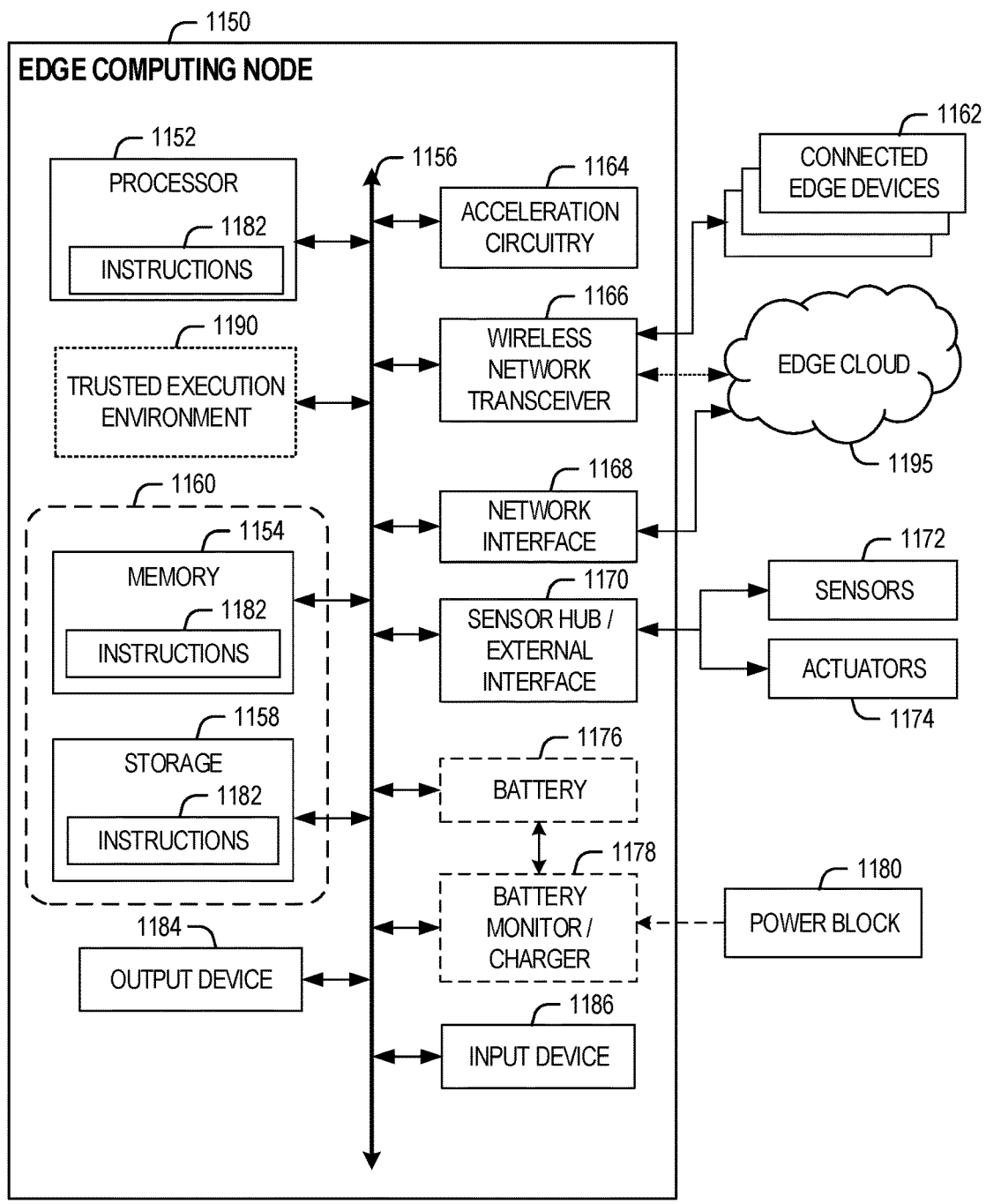
FIG. 11 provides a further overview of example components in a computing device in an edge computing system to implement examples disclosed herein.

FIG. 11 illustrates a block diagram of an example of components that may be present in an edge computing node 1150 for implementing the techniques (e.g., operations, processes, methods, and methodologies) described herein. This edge computing node 1150 provides a closer view of the respective components of node 1100 when implemented as or as part of a computing device (e.g., as a mobile device, a base station, server, gateway, etc.). The edge computing node 1150 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1150, or as components otherwise incorporated within a chassis of a larger system.

The edge computing device 1150 may include processing circuitry in the form of a processor 1152, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation, Santa Clara, California. As an example, the processor 1152 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1152 and accompanying circuitry may be provided in a single socket form factor, multiple socket form factor, or a variety of other formats, including in limited hardware configurations or configurations that include fewer than all elements shown in FIG. 11.

The processor 1152 may communicate with a system memory 1154 over an interconnect 1156 (e.g., a bus). Any number of memory devices may be used to provide for a given amount of system memory. As examples, the memory 1154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid-state disk drive (SSDD). Other devices that may be used for the storage 1158 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1156 may couple the processor 1152 to a transceiver 1166, for communications with the connected edge devices 1162. The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on Bluetooth Low Energy (BLE), or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in a cloud (e.g., an edge cloud 1195) via local or wide area network protocols. The wireless network transceiver 1166 may be a low-power wide-area (LPWA) transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1168 may be included to provide a wired communication to nodes of the edge cloud 1195 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global navigation system (e.g., GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1150. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the edge computing node 1150, although, in examples in which the edge computing node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the edge computing node 1150. The processor 1152 may access the non-transitory, machine-readable medium 1160 over the interconnect 1156. For instance, the non-transitory, machine-readable medium 1160 may be embodied by devices described for the storage 1158 or may include specific storage units such as optical disks, flash drives, or any number of other hardware devices. The non-transitory, machine-readable medium 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1182 on the processor 1152 (separately, or in combination with the instructions 1182 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 12:
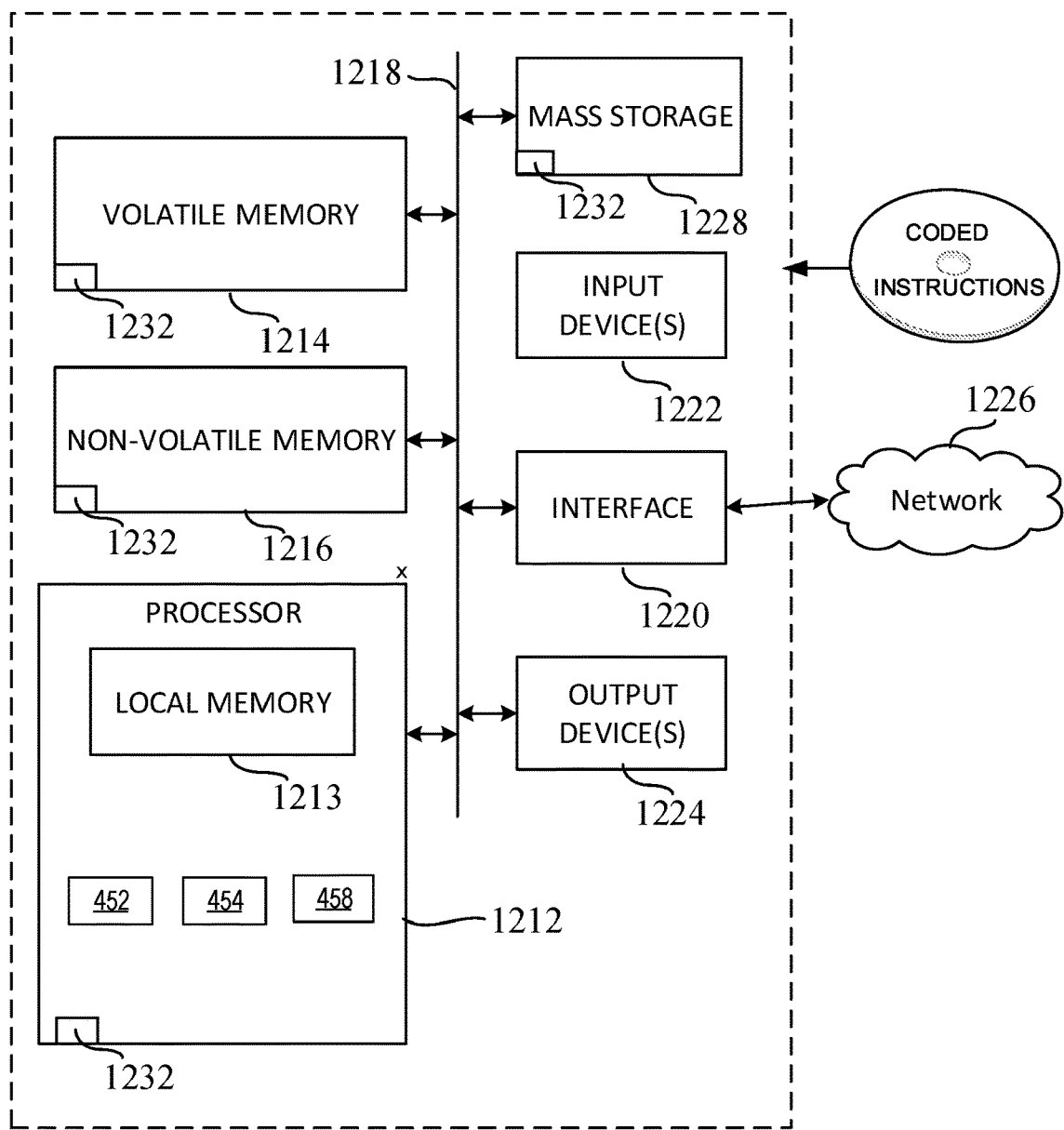
FIG. 12 is a block diagram of an example processing platform structured to execute the instructions of FIGS. 7-10 to implement the example device platform of FIG. 4, the example edge platform of FIGS. 4-6, and/or the example remote secure power grid platform of FIGS. 4-6 to enable secure pooled memory sharing in accordance with teachings of this disclosure.

FIG. 12 is a block diagram of an example processor platform 1200 structured to execute the instructions of FIGS. 7-10 to implement the remote secured and power grid platform 450 of FIGS. 4-6. In other examples, the processor platform 1200 implements the example device platform 402 (FIG. 4). In yet other examples, the processor platform 1200 implements the example edge platform 422 (FIGS. 4-6). The processor platform 1200 can be, for example, a server, a personal computer, a workstation, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1220. The input device(s) 1022 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 7-10 may be stored in the mass storage device 1228, in the volatile memory 1214, in the non-volatile memory 1216, and/or on a removable non-transitory computer readable storage medium such as a CD or DVD.

Figure 13:
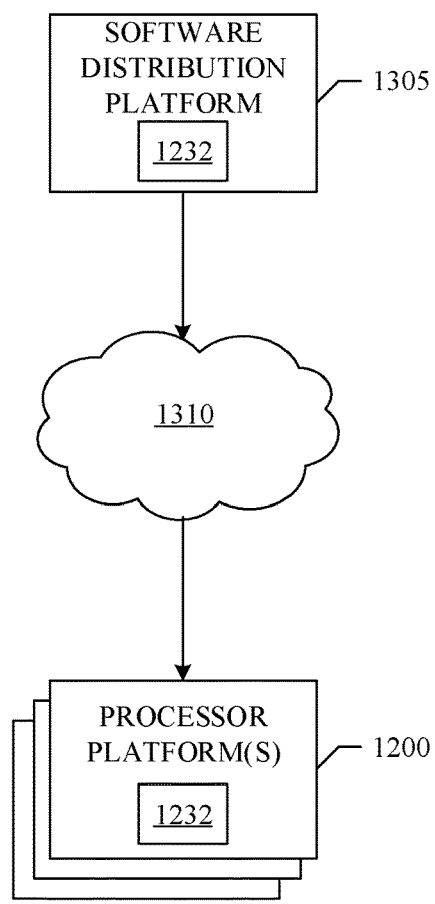
FIG. 13 is a block diagram of an example software distribution platform to distribute software (e.g., software corresponding to the example computer readable instructions of FIGS. 7-10) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1305 to distribute software such as the example computer readable instructions 1232 of FIG. 12 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the computer readable instructions 1232, which may correspond to the example computer readable instructions 1232 of FIGS. 7-10, as described above. The one or more servers of the example software distribution platform 1305 are in communication with a network 1310, which may correspond to any one or more of the Internet and/or any of the example networks 1226 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1232 from the software distribution platform 1305. For example, the software, which may correspond to the example computer readable instructions 1232 of FIG. 12, may be downloaded to the example processor platform 1200, which is to execute the computer readable instructions 1232 to implement the, the example device platform 402 of FIG. 4, the example edge platform 422 of FIGS. 4-6, and/or the example remote secured and power grid platform 450 of FIGS. 4-6. In some example, one or more servers of the software distribution platform 1305 periodically offer, transmit, and/or force updates to the software (e.g., the example computer readable instructions 1232 of FIG. 10) to ensure improvements, patches, updates, etc. are distributed and applied to the software at the end user devices.

From the foregoing, it will be appreciated that example methods, apparatus and articles of manufacture have been disclosed that enable secure shared memory access in an edge network. The disclosed methods, apparatus and articles of manufacture improve the efficiency of using a computing device by ensuring security and coherency in memory shared by multiple tenants in an edge network. The disclosed methods, apparatus and articles of manufacture are accordingly directed to one or more improvement(s) in the functioning of a computer.

Example methods, apparatus, systems, and articles of manufacture to enable secure multi-coherent and pooled memory in an edge network are disclosed herein. Further examples and combinations thereof include the following:

Example 1 includes an apparatus, comprising a pooled memory controller to map a first node to a memory region in response to receiving a memory access request from a second node, the second node mapped to the memory region, provide a private security key associated with the memory region to the first node, and a caching agent to apply a cache coherency protocol to the first node and the second node in response to the pooled memory controller mapping the first node to the memory region.

Example 2 includes the apparatus of example 1, wherein the first node is one of an edge device, an edge gateway server, or a base station.

Example 3 includes the apparatus of example 1, wherein the pooled memory controller is to communicate with the first node and the second node via a first communication channel.

Example 4 includes the apparatus of example 3, wherein the first communication channel is to implement a component library for cross-platform (e.g., CXL) memory framework.

Example 5 includes the apparatus of example 1, wherein the caching agent is to communicate with the first node and the second node via a second communication channel.

Example 6 includes the apparatus of example 5, wherein the second communication channel is to implement a component library for cross-platform (e.g., CXL) cache framework.

Example 7 includes the apparatus of example 1, wherein the private security key is a private symmetric security key.

Example 8 includes the apparatus of example 1, wherein the cache coherency protocol is a snoop-based coherency protocol.

Example 9 includes the apparatus of example 8, wherein the snoop-based coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

Example 10 includes the apparatus of example 1, including a management interface to coordinate at least one of allocation, sharing, or deletion of memory corresponding to the memory region.

Example 11 includes the apparatus of example 1, wherein the private security key is generated by an orchestrator.

Example 12 includes a non-transitory computer readable medium comprising computer readable instructions that, when executed, cause at least one processor to at least map a first node to a memory region in response to a memory access request from a second node, the second node mapped to the memory region, provide a private security key associated with the memory region to the first node, and apply a cache coherency protocol to the first node and the second node in response to mapping the first node to the memory region.

Example 13 includes the non-transitory computer readable medium of example 12, wherein the first node is one of an edge device, an edge gateway server, or a base station.

Example 14 includes the non-transitory computer readable medium of example 12, wherein the computer readable instructions are to cause the at least one processor to at least communicate with the first node and the second node via a first communication channel.

Example 15 includes the non-transitory computer readable medium of example 14, wherein the first communication channel is to implement a component library for cross-platform (e.g., CXL) memory framework.

Example 16 includes the non-transitory computer readable medium of example 12, wherein the computer readable instructions are to cause the at least one processor to at least communicate with the first node and the second node via a second communication channel.

Example 17 includes the non-transitory computer readable medium of example 16, wherein the second communication channel is to implement a component library for cross-platform (e.g., CXL) cache framework.

Example 18 includes the non-transitory computer readable medium of example 12, wherein the private security key is a private symmetric security key.

Example 19 includes the non-transitory computer readable medium of example 12, wherein the cache coherency protocol is a snoop-based coherency protocol.

Example 20 includes the non-transitory computer readable medium of example 19, wherein the snoop-based coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

Example 21 includes the non-transitory computer readable medium example 12, including a management interface to coordinate at least one of allocation, sharing, or deletion of memory corresponding to the memory region.

Example 22 includes the non-transitory computer readable medium of example 12, wherein the private security key is generated by an orchestrator.

Example 23 includes an apparatus, comprising means for mapping a first node to a memory region in response to a memory access request from a second node, the second node mapped to the memory region, means for providing a private security key associated with the memory region to the first node, and means for applying a cache coherency protocol to the first node and the second node in response to mapping the first node to the memory region.

Example 24 includes the apparatus of example 23, wherein the first node is one of an edge device, an edge gateway server, or a base station.

Example 25 includes the apparatus of example 23, further including means for communicating with the first node and the second node via a first communication channel.

Example 26 includes the apparatus of example 25, wherein the first communication channel is to implement a component library for cross-platform (e.g., CXL) memory framework.

Example 27 includes the apparatus of example 23, further including means for communicating with the first node and the second node via a second communication channel.

Example 28 includes the apparatus of example 27, wherein the second communication channel is to implement a component library for cross-platform (e.g., CXL) cache framework.

Example 29 includes the apparatus of example 23, wherein the private security key is a private symmetric security key.

Example 30 includes the apparatus of example 23, wherein the cache coherency protocol is a snoop-based coherency protocol.

Example 31 includes the apparatus of example 30, wherein the snoop-based coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

Example 32 includes the apparatus of example 23, including a management interface to coordinate at least one of allocation, sharing, or deletion of memory corresponding to the memory region.

Example 33 includes the apparatus of example 23, wherein the private security key is generated by an orchestrator.

Example 34 includes a method, comprising mapping a first node to a memory region in response to a memory access request from a second node, the second node mapped to the memory region, providing a private security key associated with the memory region to the first node, and applying a cache coherency protocol to the first node and the second node in response to mapping the first node to the memory region.

Example 35 includes the method of example 34, wherein the first node is one of an edge device, an edge gateway server, or a base station.

Example 36 includes the method of example 34, including communicating with the first node and the second node via a first communication channel.

Example 37 includes the method of example 36, wherein the first communication channel is to implement a component library for cross-platform (e.g., CXL) memory framework.

Example 38 includes the method of example 34, including communicating with the first node and the second node via a second communication channel.

Example 39 includes the method of example 38, wherein the second communication channel is to implement a component library for cross-platform (e.g., CXL) cache framework.

Example 40 includes the method of example 34, wherein the private security key is a private symmetric security key.

Example 41 includes the method of example 34, wherein the cache coherency protocol is a snoop-based coherency protocol.

Example 42 includes the method of example 41, wherein the snoop-based coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

Example 43 includes the method of example 34, including a management interface to coordinate at least one of allocation, sharing, or deletion of memory corresponding to the memory region.

Example 44 includes the method of example 34, wherein the private security key is generated by an orchestrator.

Example 45 is at least one machine-readable medium including instructions that, when executed by processing circuitry, cause the processing circuitry to perform operations to implement any of Examples 1-44.

Example 46 is an apparatus comprising means to implement any of Examples 1-44.

Example 47 is a system to implement any of Examples 1-44.

Example 48 is a method to implement any of Examples 1-44.

Example 49 is a multi-tier edge computing system, comprising a plurality of edge computing nodes provided among on-premise edge, network access edge, or near edge computing settings, the plurality of edge computing nodes configured to perform any of the methods of Examples 1-44.

Example 50 is an edge computing system, comprising a plurality of edge computing nodes, each of the plurality of edge computing nodes configured to perform any of the methods of Examples 1-44.

Example 51 is an edge computing node, operable as a server hosting the service and a plurality of additional services in an edge computing system, configured to perform any of the methods of Examples 1-44.

Example 52 is an edge computing node, operable in a layer of an edge computing network as an aggregation node, network hub node, gateway node, or core data processing node, configured to perform any of the methods of Examples 1-44.

Example 53 is an edge provisioning, orchestration, or management node, operable in an edge computing system, configured to implement any of the methods of Examples 1-44.

Example 54 is an edge computing network, comprising networking and processing components configured to provide or operate a communications network, to enable an edge computing system to implement any of the methods of Examples 1-44.

Example 55 is an access point, comprising networking and processing components configured to provide or operate a communications network, to enable an edge computing system to implement any of the methods of Examples 1-44.

Example 56 is a base station, comprising networking and processing components configured to provide or operate a communications network, configured as an edge computing system to implement any of the methods of Examples 1-44.

Example 57 is a road-side unit, comprising networking components configured to provide or operate a communications network, configured as an edge computing system to implement any of the methods of Examples 1-44.

Example 58 is an on-premise server, operable in a private communications network distinct from a public edge computing network, configured as an edge computing system to implement any of the methods of Examples 1-44.

Example 59 is a 3GPP 4G/LTE mobile wireless communications system, comprising networking and processing components configured as an edge computing system to implement any of the methods of Examples 1-44.

Example 60 is a 5G network mobile wireless communications system, comprising networking and processing components configured as an edge computing system to implement any of the methods of Examples 1-44.

Example 61 is an edge computing system configured as an edge mesh, provided with a microservice cluster, a microservice cluster with sidecars, or linked microservice clusters with sidecars, configured to implement any of the methods of Examples 1-44.

Example 62 is an edge computing system, comprising circuitry configured to implement services with one or more isolation environments provided among dedicated hardware, virtual machines, containers, or virtual machines on containers, the edge computing system configured to implement any of the methods of Examples 1-44.

Example 63 is an edge computing system, comprising networking and processing components to communicate with a user equipment device, client computing device, provisioning device, or management device to implement any of the methods of Examples 1-44.

Example 64 is networking hardware with network functions implemented thereupon, operable within an edge computing system, the network functions configured to implement any of the methods of Examples 1-44.

Example 65 is acceleration hardware with acceleration functions implemented thereupon, operable in an edge computing system, the acceleration functions configured to implement any of the methods of Examples 1-44.

Example 66 is storage hardware with storage capabilities implemented thereupon, operable in an edge computing system, the storage hardware configured to implement any of the methods of Examples 1-44.

Example 67 is computation hardware with compute capabilities implemented thereupon, operable in an edge computing system, the computation hardware configured to implement any of the methods of Examples 1-44.

Example 68 is an edge computing system configured to implement services with any of the methods of Examples 1-44, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 69 is an apparatus of an edge computing system comprising: one or more processors and one or more computer-readable media comprising instructions that, when executed by the one or more processors, cause the one or more processors to perform any of the methods of Examples 1-44.

Example 70 is one or more computer-readable storage media comprising instructions to cause an electronic device of an edge computing system, upon execution of the instructions by one or more processors of the electronic device, to perform any of the methods of Examples 1-44.

Example 71 is a computer program used in an edge computing system, the computer program comprising instructions, wherein execution of the program by a processing element in the edge computing system is to cause the processing element to perform any of the methods of Examples 1-44.

Example 72 is an edge computing appliance device operating as a self-contained processing system, comprising a housing, case, or shell, network communication circuitry, storage memory circuitry, and processor circuitry adapted to perform any of the methods of Examples 1-44.

Example 73 is an apparatus of an edge computing system comprising means to perform any of the methods of Examples 1-44.

Example 74 is an apparatus of an edge computing system comprising logic, modules, or circuitry to perform any of the methods of Examples 1-44.

Example 75 is an edge computing system, including respective edge processing devices and nodes to invoke or perform any of the operations of Examples 1-44, or other subject matter described herein.

Example 76 is a client endpoint node, operable to invoke or perform the operations of any of Examples 1-44, or other subject matter described herein.

Example 77 is an aggregation node, network hub node, gateway node, or core data processing node, within or coupled to an edge computing system, operable to invoke or perform the operations of any of Examples 1-44, or other subject matter described herein.

Example 78 is an access point, base station, road-side unit, street-side unit, or on-premise unit, within or coupled to an edge computing system, operable to invoke or perform the operations of any of Examples 1-44, or other subject matter described herein.

Example 79 is an edge provisioning node, service orchestration node, application orchestration node, or multi-tenant management node, within or coupled to an edge computing system, operable to invoke or perform the operations of any of Examples 1-44, or other subject matter described herein.

Example 80 is an edge node operating an edge provisioning service, application or service orchestration service, virtual machine deployment, container deployment, function deployment, and compute management, within or coupled to an edge computing system, operable to invoke or perform the operations of any of Examples 1-44, or other subject matter described herein.

Example 81 is an edge computing system including aspects of network functions, acceleration functions, acceleration hardware, storage hardware, or computation hardware resources, operable to invoke or perform the use cases discussed herein, with use of any Examples 1-44, or other subject matter described herein.

Example 82 is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of any of Examples 1-44, or other subject matter described herein.

Example 83 is an edge computing system adapted for mobile wireless communications, including configurations according to a 3GPP 4G/LTE or 5G network capabilities, operable to invoke or perform the use cases discussed herein, with use of any of Examples 1-44, or other subject matter described herein.

Example 84 is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of any of Examples 1-44, or other subject matter described herein.

Example 85 is networking hardware, acceleration hardware, storage hardware, or computation hardware, with capabilities implemented thereupon, operable in an edge computing system to invoke or perform the use cases discussed herein, with use of any of Examples 1-44, or other subject matter described herein.

Example 86 is an apparatus of an edge computing system comprising: one or more processors and one or more computer-readable media comprising instructions that, when deployed and executed by the one or more processors, cause the one or more processors to invoke or perform the use cases discussed herein, with use of any of Examples 1-44, or other subject matter described herein.

Example 87 is one or more computer-readable storage media comprising instructions to cause an electronic device of an edge computing system, upon execution of the instructions by one or more processors of the electronic device, to invoke or perform the use cases discussed herein, with use of any of Examples 1-44, or other subject matter described herein.

Example 88 is an apparatus of an edge computing system comprising means, logic, modules, or circuitry to invoke or perform the use cases discussed herein, with the use of any of Examples 1-44, or other subject matter described herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A server comprising:
   interface circuitry at a data center, the interface circuitry to communicate with an edge node and a base station in an edge network;
   memory including a memory region;
   machine-readable instructions; and
   at least one processor circuit to be programmed by the machine-readable instructions to:
      determine the base station is authorized to access the memory region of the memory;
      generate a private security key, the private security key to encrypt data corresponding to the memory region of the memory;
      map the edge node to the memory region after receiving a memory access request from the base station, the base station mapped to the memory region;
      provide the private security key associated with the memory region to the edge node; and
      apply a cache coherency protocol to the edge node and the base station in the edge network after the edge node is mapped to the memory region and after detection of an access of the memory region, the cache coherency protocol to maintain coherency of memory contents between the edge node and the base station.

2. The server of claim 1, wherein the edge node is at least one of an edge device, an edge gateway server, or a second base station.

3. The server of claim 1, wherein the interface circuitry is to communicate with the edge node and the base station via a communication channel.

4. The server of claim 3, wherein the communication channel is to implement a component library for cross-platform memory framework.

5. The server of claim 3, wherein the second communication channel is to implement a component library for cross-platform cache framework.

6. The server of claim 1, wherein the private security key is a private symmetric security key.

7. The server of claim 1, wherein one or more of the at least one processor circuit is to use a snoop-based coherency protocol as the cache coherency protocol.

8. The server of claim 7, wherein the snoop-based coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

9. The server of claim 1, wherein one or more of the at least one processor circuit is to coordinate at least one of allocation, sharing, or deletion of a portion of the memory region.

10. The server of claim 1, wherein the private security key is generated by an orchestrator.

11. A non-transitory computer readable medium comprising computer readable instructions to cause at least one processor circuit at a server to at least:
    determine a base station in an edge network is authorized to access a memory region in memory of the server;
    generate a private security key, the private security key to encrypt data corresponding to the memory region of the memory;
    map an edge node in the edge network to the memory region after a memory access request from the base station, the base station mapped to the memory region;
    provide the private security key associated with the memory region to the edge node; and
    apply a cache coherency protocol to the edge node and the base station in the edge network after the edge node is mapped to the memory region and after detection of an access of the memory region, the cache coherency protocol to maintain coherency of memory contents between the edge node and the base station.

12. The non-transitory computer readable medium of claim 11, wherein the edge node is at least one of an edge device, an edge gateway server, or a second base station.

13. The non-transitory computer readable medium of claim 11, wherein the computer readable instructions are to cause one or more of the at least one processor circuit to at least communicate with the edge node and the base station via a first communication channel.

14. The non-transitory computer readable medium of claim 13, wherein the communication channel is to implement a component library for cross-platform memory framework.

15. The non-transitory computer readable medium of claim 13, wherein the communication channel is to implement a component library for cross-platform cache framework.

16. The non-transitory computer readable medium of claim 11, wherein the private security key is a private symmetric security key.

17. The non-transitory computer readable medium of claim 11, wherein the cache coherency protocol is a snoop-based coherency protocol.

18. The non-transitory computer readable medium of claim 17, wherein the snoop-based coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

19. The non-transitory computer readable medium of claim 11, wherein the computer readable instructions are to cause one or more of the at least one processor circuit to at least coordinate at least one of allocation, sharing, or deletion of a portion of the memory region.

20. The non-transitory computer readable medium of claim 11, wherein the private security key is generated by an orchestrator.

21. An apparatus, comprising:
    security means for:

determining a base station in an edge network is authorized to access a memory region of memory; and generating a private security key, the private security key to encrypt data corresponding to the memory region of the memory;

means for mapping an edge node in the edge network to the memory region after a memory access request from the base station, the base station mapped to the memory region;

means for providing the private security key associated with the memory region to the edge node; and means for applying a cache coherency protocol to the edge node and the base station in the edge network after the mapping of the edge node to the memory region and after detection of an access of the memory region, the cache coherency protocol to maintain coherency of memory contents between the edge node and the base station.

22. The apparatus of claim 21, wherein the cache coherency protocol is a snoop-based coherency protocol.

23. A method, comprising:

determining, by at least one processor circuit programmed by at least one instruction, a base station in an edge network is authorized to access a memory region of memory of a server;

generating a private security key, the private security key to encrypt data corresponding to the memory region of the memory;

mapping, by one or more of the at least one processor circuit, an edge node in the edge network to the memory region after a memory access request from the base station, the base station mapped to the memory region;

providing the private security key associated with the memory region to the edge node; and applying a cache coherency protocol to the edge node and the base station in the edge network after the mapping of the edge node to the memory region and after detection of an access of the memory region, the cache coherency protocol to maintain coherency of memory contents between the edge node and the base station.

24. The server of claim 1, wherein one or more of the at least one processor circuit is to obtain a payload tunneled from the edge node, the payload corresponding to the memory region.

25. The method of claim 23, wherein the cache coherency protocol is at least one of (a) a modified, shared, invalid (MSI) protocol, (b) a modified, exclusive, shared, invalid (MESI) protocol, (c) a modified, owned, shared, invalid (MOSI) protocol, or (d) a modified, owned, exclusive, shared, invalid (MOESI) protocol.

26. The apparatus of claim 21, wherein the private security key is a private symmetric security key.

* * * * *